US 9,998,379 B2

(12) United States Patent
Nanda et al.

(10) Patent No.: US 9,998,379 B2
(45) Date of Patent: Jun. 12, 2018

(54) METHOD AND APPARATUS FOR CONTROLLING DATA RATE OF A REVERSE LINK IN A COMMUNICATION SYSTEM

(71) Applicant: QUALCOMM Incorporated, San Diego, CA (US)

(72) Inventors: Sanjiv Nanda, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days. days.

(21) Appl. No.: 14/722,027

(22) Filed: May 26, 2015

(65) Prior Publication Data
US 2015/0256463 A1 Sep. 10, 2015

Related U.S. Application Data

(63) Continuation of application No. 10/628,955, filed on Jul. 28, 2003, now abandoned.
(Continued)

(51) Int. Cl.
*H04W 4/00* (2009.01)
*H04L 12/801* (2013.01)
(Continued)

(52) U.S. Cl.
CPC ............ *H04L 47/14* (2013.01); *H04L 1/0002* (2013.01); *H04L 1/0017* (2013.01); *H04L 47/30* (2013.01);
(Continued)

(58) Field of Classification Search
CPC ....... H04L 47/14; H04L 1/0002; H04L 47/30; H04L 47/6215; H04W 72/1221; H04W 28/02; H04W 28/0289; H04W 28/06
See application file for complete search history.

(56) References Cited

U.S. PATENT DOCUMENTS

| 2,149,518 A | 3/1939 | Frank, Sr. |
| 3,470,324 A | 9/1969 | Harmuth |

(Continued)

FOREIGN PATENT DOCUMENTS

| CN | 1166094 | 11/1997 |
| CN | 1255792 A | 6/2000 |

(Continued)

OTHER PUBLICATIONS

3G TS 25.211 "Physical channels and mapping of transport channels onto physical channels (FDD)", Release 5, V5.0.0, Mar. 2002.
(Continued)

*Primary Examiner* — Abdelnabi O Musa
(74) *Attorney, Agent, or Firm* — MG-IP Law, P.C

(57) ABSTRACT

Various aspects of the invention provide for determining data rate for a reverse link communication by determining packets of data for transmission for a number of communication services, determining a data rate for transmission of the packets of data based on an arrangement of the packets of data in a queue allowing for meeting the transmission deadline for each of the packets of data. The base station determines whether available resources allow for allocation at the base station for transmission from the mobile station at the determined data rate and duration. The mobile station drops at least a packet of data of the packets of data in the queue to determine a new queue of packets of data. The new queue of the packets of data is used to determine a new data rate for communication on the reverse link.

23 Claims, 7 Drawing Sheets

Related U.S. Application Data

(60) Provisional application No. 60/469,376, filed on May 9, 2003, provisional application No. 60/448,269, filed on Feb. 18, 2003.

(51) Int. Cl.
  *H04L 1/00* (2006.01)
  *H04L 12/835* (2013.01)
  *H04W 28/22* (2009.01)
  *H04L 12/863* (2013.01)
  *H04L 1/18* (2006.01)
  *H04W 72/12* (2009.01)

(52) U.S. Cl.
  CPC ......... *H04L 47/6215* (2013.01); *H04W 28/22* (2013.01); *H04L 1/005* (2013.01); *H04L 1/1867* (2013.01); *H04W 72/1221* (2013.01)

(56) References Cited

U.S. PATENT DOCUMENTS

| | | | |
|---|---|---|---|
| 4,768,023 A | 8/1988 | Xie | |
| 5,280,472 A | 1/1994 | Gilhousen et al. | |
| 5,394,433 A | 2/1995 | Bantz et al. | |
| 5,406,585 A | 4/1995 | Rohani et al. | |
| 5,463,342 A | 10/1995 | Guard | |
| 5,483,557 A | 1/1996 | Webb | |
| 5,490,165 A | 2/1996 | Blakeney, II et al. | |
| 5,535,214 A | 7/1996 | Shiobara | |
| 5,544,156 A | 8/1996 | Teder et al. | |
| 5,553,062 A | 9/1996 | Schilling et al. | |
| 5,581,575 A | 12/1996 | Zehavi et al. | |
| 5,592,470 A | 1/1997 | Rudrapatna et al. | |
| 5,627,938 A | 5/1997 | Johnston | |
| 5,647,366 A | 7/1997 | Weng | |
| 5,712,869 A | 1/1998 | Lee et al. | |
| 5,719,852 A | 2/1998 | Schilling et al. | |
| 5,726,978 A | 3/1998 | Frodigh et al. | |
| 5,732,391 A | 3/1998 | Fiocca | |
| 5,745,480 A | 4/1998 | Behtash et al. | |
| 5,752,193 A | 5/1998 | Scholefield et al. | |
| 5,754,537 A | 5/1998 | Jamal | |
| 5,764,551 A | 6/1998 | McCorkle | |
| 5,774,809 A | 6/1998 | Tuutijarvi et al. | |
| 5,781,861 A | 7/1998 | Kang et al. | |
| 5,809,059 A | 9/1998 | Souissi et al. | |
| 5,815,526 A | 9/1998 | Rice | |
| 5,857,174 A | 1/1999 | Dugan | |
| 5,859,870 A | 1/1999 | Tsujimoto | |
| 5,862,451 A | 1/1999 | Grau et al. | |
| 5,864,760 A | 1/1999 | Gilhousen et al. | |
| 5,875,214 A | 2/1999 | Urbaniak et al. | |
| 5,903,608 A | 5/1999 | Chun | |
| 5,914,950 A | 6/1999 | Tiedemann, Jr. et al. | |
| 5,920,705 A | 7/1999 | Lyon et al. | |
| 5,923,650 A | 7/1999 | Chen et al. | |
| 5,938,749 A | 8/1999 | Rusu et al. | |
| 5,956,642 A | 9/1999 | Larsson et al. | |
| 5,966,377 A | 10/1999 | Murai | |
| 5,966,670 A | 10/1999 | Keskitalo et al. | |
| 5,969,751 A | 10/1999 | Lee | |
| 5,973,642 A | 10/1999 | Li et al. | |
| 5,987,326 A | 11/1999 | Tiedemann, Jr. et al. | |
| 5,991,271 A | 11/1999 | Jones et al. | |
| 5,991,273 A | 11/1999 | Abu-Dayya | |
| 5,991,284 A | 11/1999 | Willenegger et al. | |
| 6,005,876 A | 12/1999 | Cimini, Jr. et al. | |
| 6,014,373 A | 1/2000 | Schilling et al. | |
| 6,046,980 A | 4/2000 | Packer | |
| 6,049,716 A | 4/2000 | Jung | |
| 6,052,594 A | 4/2000 | Chuang et al. | |
| 6,061,359 A | 5/2000 | Schilling et al. | |
| 6,064,692 A | 5/2000 | Chow | |
| 6,085,091 A | 7/2000 | Yoo et al. | |
| 6,088,387 A | 7/2000 | Gelblum et al. | |
| 6,094,459 A | 7/2000 | Kao et al. | |
| 6,101,168 A | 8/2000 | Chen et al. | |
| 6,108,374 A | 8/2000 | Balachandran et al. | |
| 6,108,384 A | 8/2000 | Okumura et al. | |
| 6,111,911 A | 8/2000 | Sanderford, Jr. et al. | |
| 6,115,357 A | 9/2000 | Packer et al. | |
| 6,128,283 A | 10/2000 | Sabaa et al. | |
| 6,128,349 A | 10/2000 | Chow | |
| 6,128,882 A | 10/2000 | Jones | |
| 6,130,882 A | 10/2000 | Levin | |
| 6,131,016 A | 10/2000 | Greenstein et al. | |
| 6,134,215 A | 10/2000 | Agrawal et al. | |
| 6,134,218 A | 10/2000 | Holden | |
| 6,141,388 A | 10/2000 | Servais et al. | |
| 6,144,654 A | 11/2000 | Ibanez-Meier et al. | |
| 6,151,696 A | 11/2000 | Miller et al. | |
| 6,167,270 A | 12/2000 | Rezaiifar et al. | |
| 6,195,552 B1 | 2/2001 | Jeong et al. | |
| 6,201,576 B1 | 3/2001 | Raghunath et al. | |
| 6,201,954 B1 | 3/2001 | Soliman | |
| 6,205,129 B1 | 3/2001 | Esteves et al. | |
| 6,208,699 B1 | 3/2001 | Chen et al. | |
| 6,208,858 B1 | 3/2001 | Antonio et al. | |
| 6,219,374 B1 | 4/2001 | Kim et al. | |
| 6,222,875 B1 | 4/2001 | Dahlman et al. | |
| 6,222,888 B1 | 4/2001 | Kao et al. | |
| 6,230,203 B1 | 5/2001 | Koperda et al. | |
| 6,233,455 B1 | 5/2001 | Ramakrishna et al. | |
| 6,259,746 B1 | 7/2001 | Levin et al. | |
| 6,285,886 B1 | 9/2001 | Kamel et al. | |
| 6,292,515 B1 | 9/2001 | Kao et al. | |
| 6,298,041 B1 | 10/2001 | Packer | |
| 6,307,844 B1 | 10/2001 | Tsunehara et al. | |
| 6,317,435 B1 | 11/2001 | Tiedemann, Jr. et al. | |
| 6,332,084 B1 | 12/2001 | Shaanan et al. | |
| 6,335,922 B1 | 1/2002 | Tiedemann, Jr. et al. | |
| 6,347,080 B2 | 2/2002 | Jou et al. | |
| 6,351,460 B1 | 2/2002 | Tiedemann et al. | |
| 6,363,255 B1 | 3/2002 | Kuwahara | |
| 6,389,056 B1 | 5/2002 | Kanterakis et al. | |
| 6,414,988 B1 | 7/2002 | Ling | |
| 6,425,105 B1 | 7/2002 | Piirainen et al. | |
| 6,426,960 B2 | 7/2002 | Antonio | |
| 6,442,130 B1 | 8/2002 | Jones, IV et al. | |
| 6,456,653 B1 | 9/2002 | Sayeed | |
| 6,473,418 B1 | 10/2002 | Laroia et al. | |
| 6,483,816 B2 | 11/2002 | Tsunehara et al. | |
| 6,490,461 B1 | 12/2002 | Muller | |
| 6,496,496 B1 | 12/2002 | Ramakrishna et al. | |
| 6,505,058 B1 | 1/2003 | Willey | |
| 6,507,585 B1 | 1/2003 | Dobson | |
| 6,512,925 B1 | 1/2003 | Chen et al. | |
| 6,532,363 B1 | 3/2003 | Pussinen | |
| 6,535,723 B1 | 3/2003 | Jiang et al. | |
| 6,549,561 B2 | 4/2003 | Crawford | |
| 6,563,810 B1 | 5/2003 | Corazza | |
| 6,563,885 B1 | 5/2003 | Magee et al. | |
| 6,570,444 B2 | 5/2003 | Wright | |
| 6,571,101 B1 | 5/2003 | Schulz | |
| 6,571,104 B1 | 5/2003 | Nanda et al. | |
| 6,574,205 B1 | 6/2003 | Sato | |
| 6,590,879 B1 | 7/2003 | Huang et al. | |
| 6,597,913 B2 | 7/2003 | Natarajan | |
| 6,609,007 B1 | 8/2003 | Eibling et al. | |
| 6,611,507 B1 | 8/2003 | Hottinen et al. | |
| 6,654,609 B2 | 11/2003 | Kim | |
| 6,680,925 B2 | 1/2004 | Wu et al. | |
| 6,693,892 B1 | 2/2004 | Rinne et al. | |
| 6,694,469 B1 | 2/2004 | Jalali et al. | |
| 6,701,151 B2 | 3/2004 | Diachina et al. | |
| 6,711,208 B2 | 3/2004 | Razoumov et al. | |
| 6,728,270 B1 * | 4/2004 | Meggers ............ H04L 12/5695 370/252 |
| 6,741,862 B2 | 5/2004 | Chung et al. | |
| 6,744,754 B1 | 6/2004 | Lee | |
| 6,751,264 B2 | 6/2004 | Ho et al. | |
| 6,751,444 B1 | 6/2004 | Meiyappan | |
| 6,757,241 B1 | 6/2004 | Jones et al. | |
| 6,760,303 B1 | 7/2004 | Brouwer | |

(56) References Cited

U.S. PATENT DOCUMENTS

| | | |
|---|---|---|
| 6,771,700 B1 | 8/2004 | Razoumov et al. |
| 6,775,254 B1 | 8/2004 | Willenegger et al. |
| 6,775,544 B2 | 8/2004 | Ficarra |
| RE38,603 E | 9/2004 | Kim et al. |
| 6,816,827 B1 | 11/2004 | Xia et al. |
| 6,836,666 B2 | 12/2004 | Gopalakrishnan et al. |
| 6,847,623 B1 | 1/2005 | Vayanos et al. |
| 6,847,826 B1 | 1/2005 | Wesby et al. |
| 6,847,828 B2 | 1/2005 | Miyoshi et al. |
| 6,862,457 B1 | 3/2005 | Sarkar et al. |
| 6,865,389 B2 | 3/2005 | Lee et al. |
| 6,868,077 B1 | 3/2005 | Gourgue et al. |
| 6,876,641 B2 | 4/2005 | Banister |
| 6,879,576 B1 | 4/2005 | Agrawal et al. |
| 6,880,103 B2 | 4/2005 | Kim et al. |
| 6,898,418 B2 | 5/2005 | Rauschmayer |
| 6,904,286 B1 | 6/2005 | Dantu |
| 6,917,581 B2 | 7/2005 | Proctor, Jr. et al. |
| 6,937,582 B1 | 8/2005 | Kronestedt |
| 6,952,561 B1 | 10/2005 | Kumar et al. |
| 6,963,543 B2 | 11/2005 | Diep et al. |
| 6,982,946 B2 | 1/2006 | Wiberg et al. |
| 6,987,798 B2 | 1/2006 | Ahn et al. |
| 6,996,763 B2 | 2/2006 | Sarkar et al. |
| 6,999,430 B2 | 2/2006 | Holtzman et al. |
| 7,006,429 B2 | 2/2006 | Yoshida et al. |
| 7,012,912 B2 | 3/2006 | Naguib et al. |
| 7,016,651 B1 | 3/2006 | Narasimhan |
| 7,031,741 B2 | 4/2006 | Lee et al. |
| 7,047,473 B2 | 5/2006 | Hwang et al. |
| 7,050,406 B2 | 5/2006 | Hsu et al. |
| 7,054,275 B2 | 5/2006 | Kim et al. |
| 7,061,986 B2 | 6/2006 | Tonissen et al. |
| 7,068,702 B2 | 6/2006 | Chen et al. |
| 7,069,035 B2 | 6/2006 | Chen et al. |
| 7,069,038 B2 | 6/2006 | Hakkinen et al. |
| 7,072,315 B1 | 7/2006 | Liu et al. |
| 7,076,001 B2 | 7/2006 | Beadle et al. |
| 7,088,701 B1 | 8/2006 | Attar et al. |
| 7,092,706 B2 | 8/2006 | Yang |
| 7,099,397 B2 | 8/2006 | Lee et al. |
| 7,103,021 B2 | 9/2006 | Jou |
| 7,120,134 B2 | 10/2006 | Tiedemann et al. |
| 7,126,928 B2 | 10/2006 | Tiedemann et al. |
| 7,126,930 B2 | 10/2006 | Pankaj et al. |
| 7,149,199 B2 | 12/2006 | Sung et al. |
| 7,155,236 B2 | 12/2006 | Chen et al. |
| 7,158,504 B2 | 1/2007 | Kadaba et al. |
| 7,164,669 B2 | 1/2007 | Li et al. |
| 7,177,367 B2 | 2/2007 | Storm |
| 7,187,646 B2 | 3/2007 | Schramm |
| 7,190,964 B2 | 3/2007 | Damnjanovic et al. |
| 7,197,085 B1 | 3/2007 | Vella-Coleiro |
| 7,215,930 B2 | 5/2007 | Malladi |
| 7,245,600 B2 | 7/2007 | Chen |
| 7,257,101 B2 | 8/2007 | Petrus et al. |
| 7,269,186 B2 | 9/2007 | Abrol et al. |
| 7,269,389 B2 | 9/2007 | Petrus et al. |
| 7,272,199 B2 | 9/2007 | Storm et al. |
| 7,274,743 B2 | 9/2007 | Kim |
| 7,277,709 B2 | 10/2007 | Vadgama |
| 7,280,562 B2 | 10/2007 | Sindhushayana et al. |
| 7,286,558 B2 | 10/2007 | Kim et al. |
| 7,286,846 B2 | 10/2007 | Chen et al. |
| 7,289,529 B2 | 10/2007 | Sherman |
| 7,299,402 B2 | 11/2007 | Soong et al. |
| 7,313,167 B2 | 12/2007 | Yoon et al. |
| 7,315,527 B2 | 1/2008 | Wei et al. |
| 7,317,711 B2 | 1/2008 | Bae et al. |
| 7,327,716 B2 | 2/2008 | Fong et al. |
| 7,336,640 B2 | 2/2008 | McDonough et al. |
| 7,336,954 B2 | 2/2008 | Wang et al. |
| 7,418,064 B2 | 8/2008 | Wei et al. |
| 7,423,992 B2 | 9/2008 | Iwamura |
| 7,437,648 B2 | 10/2008 | Sarkar et al. |
| 7,447,258 B2 | 11/2008 | Pietila et al. |
| 7,447,287 B1 | 11/2008 | Parantainen |
| 7,463,702 B2 | 12/2008 | Ammer et al. |
| 7,505,780 B2 | 3/2009 | Wei et al. |
| 7,600,170 B2 | 10/2009 | Gaal et al. |
| 7,660,282 B2 | 2/2010 | Sarkar |
| 7,706,403 B2 | 4/2010 | Hosein |
| 8,023,950 B2 | 9/2011 | Malladi et al. |
| 8,081,598 B2 | 12/2011 | Malladi et al. |
| 8,150,407 B2 | 4/2012 | Ho et al. |
| 8,201,039 B2 | 6/2012 | Tiedemann et al. |
| 8,391,249 B2 | 3/2013 | Odenwalder et al. |
| 8,477,592 B2 | 7/2013 | Sutivong et al. |
| 8,489,949 B2 | 7/2013 | Tiedemann et al. |
| 8,526,966 B2 | 9/2013 | Chen et al. |
| 8,548,387 B2 | 10/2013 | Malladi |
| 8,576,894 B2 | 11/2013 | Odenwalder |
| 8,676,128 B2 | 3/2014 | Malladi |
| 8,699,452 B2 | 4/2014 | Sarkar |
| 8,705,588 B2 | 4/2014 | Odenwalder |
| 8,977,283 B2 | 3/2015 | Chen et al. |
| 2001/0012271 A1 | 8/2001 | Berger |
| 2001/0021180 A1 | 9/2001 | Lee et al. |
| 2001/0055287 A1 | 12/2001 | Sawada et al. |
| 2002/0012334 A1 | 1/2002 | Strawczynski et al. |
| 2002/0018446 A1 | 2/2002 | Huh et al. |
| 2002/0021683 A1 | 2/2002 | Holtzman et al. |
| 2002/0021692 A1 | 2/2002 | Huh et al. |
| 2002/0042283 A1 | 4/2002 | Moulsley |
| 2002/0051432 A1 | 5/2002 | Shin |
| 2002/0057730 A1 | 5/2002 | Karlsson et al. |
| 2002/0093918 A1 | 7/2002 | Kim et al. |
| 2002/0111183 A1 | 8/2002 | Lundby |
| 2002/0131522 A1 | 9/2002 | Felgentreff |
| 2002/0136271 A1 | 9/2002 | Hiramatsu et al. |
| 2002/0137521 A1 | 9/2002 | Kim et al. |
| 2002/0146024 A1* | 10/2002 | Harris .................. H04W 28/22 370/417 |
| 2002/0147022 A1* | 10/2002 | Subramanian ...... H04L 12/5693 455/453 |
| 2002/0150077 A1 | 10/2002 | Temerinac |
| 2002/0160767 A1 | 10/2002 | Hanly |
| 2002/0167907 A1 | 11/2002 | Sarkar et al. |
| 2002/0172192 A1 | 11/2002 | Hunzinger et al. |
| 2002/0176362 A1 | 11/2002 | Yun et al. |
| 2002/0183039 A1 | 12/2002 | Padgett et al. |
| 2003/0028251 A1 | 2/2003 | Mathews |
| 2003/0031130 A1 | 2/2003 | Vanghi |
| 2003/0039317 A1 | 2/2003 | Taylor et al. |
| 2003/0067899 A9 | 4/2003 | Chen et al. |
| 2003/0081538 A1 | 5/2003 | Walton et al. |
| 2003/0123392 A1 | 7/2003 | Ruutu et al. |
| 2003/0129981 A1 | 7/2003 | Kim |
| 2003/0137953 A1 | 7/2003 | Chae et al. |
| 2003/0142656 A1 | 7/2003 | Padovani et al. |
| 2003/0152102 A1 | 8/2003 | Morgan et al. |
| 2003/0219037 A1 | 11/2003 | Toskala et al. |
| 2004/0001536 A1 | 1/2004 | Lohtia et al. |
| 2004/0013102 A1 | 1/2004 | Fong et al. |
| 2004/0101035 A1 | 5/2004 | Boer et al. |
| 2004/0137931 A1 | 7/2004 | Sarkar et al. |
| 2004/0160922 A1 | 8/2004 | Nanda et al. |
| 2004/0203973 A1 | 10/2004 | Khan |
| 2004/0224711 A1 | 11/2004 | Panchal et al. |
| 2004/0228288 A1 | 11/2004 | Seol et al. |
| 2004/0228349 A1 | 11/2004 | Vrzic et al. |
| 2005/0003824 A1* | 1/2005 | Siris .................. H04L 47/10 455/452.1 |
| 2005/0004970 A1 | 1/2005 | Jain et al. |
| 2005/0176456 A1 | 8/2005 | Chen et al. |
| 2005/0254465 A1 | 11/2005 | Lundby et al. |
| 2006/0007892 A1 | 1/2006 | Sudo |
| 2006/0019701 A1 | 1/2006 | Ji |
| 2006/0128410 A1 | 6/2006 | Derryberry et al. |
| 2006/0165126 A1 | 7/2006 | Petersson et al. |
| 2006/0183497 A1 | 8/2006 | Paranchych et al. |
| 2006/0215737 A1 | 9/2006 | Bang et al. |
| 2007/0030820 A1 | 2/2007 | Sarkar et al. |
| 2008/0043683 A1 | 2/2008 | Kwon et al. |

(56) References Cited

U.S. PATENT DOCUMENTS

| | | |
|---|---|---|
| 2008/0194286 A1 | 8/2008 | Chen et al. |
| 2009/0052573 A1 | 2/2009 | Tiedemann, Jr. et al. |
| 2009/0083602 A1 | 3/2009 | Sarkar et al. |

FOREIGN PATENT DOCUMENTS

| | | |
|---|---|---|
| EP | 627827 | 12/1994 |
| EP | 0771084 A1 | 5/1997 |
| EP | 0783210 | 7/1997 |
| EP | 0809364 | 11/1997 |
| EP | 0912016 A2 | 4/1999 |
| EP | 0921652 | 6/1999 |
| EP | 0996304 A1 | 4/2000 |
| EP | 1069736 A1 | 1/2001 |
| EP | 1104127 A1 | 5/2001 |
| EP | 1168703 A2 | 1/2002 |
| EP | 1231807 | 8/2002 |
| EP | 1236471 A2 | 9/2002 |
| EP | 1248417 A2 | 10/2002 |
| EP | 1257140 | 11/2002 |
| EP | 1292057 | 3/2003 |
| EP | 1257140 B1 | 6/2005 |
| EP | 1326471 | 12/2008 |
| GB | 2301687 | 12/1996 |
| GB | 2352944 | 2/2001 |
| JP | 4111553 A | 4/1992 |
| JP | 6350562 A | 12/1994 |
| JP | H0766760 A | 3/1995 |
| JP | 08298498 A | 12/1996 |
| JP | H09116475 A | 5/1997 |
| JP | 09312629 | 12/1997 |
| JP | 10013325 | 1/1998 |
| JP | 11098120 A | 4/1999 |
| JP | 11154919 A | 6/1999 |
| JP | 11196043 A | 7/1999 |
| JP | 11508417 T | 7/1999 |
| JP | 2000513549 | 10/2000 |
| JP | 2000349740 | 12/2000 |
| JP | 2001016139 A | 1/2001 |
| JP | 2001036500 A | 2/2001 |
| JP | 2001238269 | 8/2001 |
| JP | 2001515300 T | 9/2001 |
| JP | 2002009734 A | 1/2002 |
| JP | 2002026808 A | 1/2002 |
| JP | 200277984 | 3/2002 |
| JP | 2002159061 | 5/2002 |
| JP | 2002522988 A | 7/2002 |
| JP | 2002232943 A | 8/2002 |
| JP | 2002528954 T | 9/2002 |
| JP | 2002534020 | 10/2002 |
| JP | 2002369258 A | 12/2002 |
| JP | 2003008521 A | 1/2003 |
| JP | 2003018117 | 1/2003 |
| JP | 2003032218 | 1/2003 |
| JP | 2003060606 | 2/2003 |
| JP | 2003060609 A | 2/2003 |
| JP | 2003069523 A | 3/2003 |
| JP | 2004032518 A | 1/2004 |
| JP | 2004166038 A | 6/2004 |
| JP | 2004214746 A | 7/2004 |
| JP | 2004320679 | 11/2004 |
| JP | 2005505955 T | 2/2005 |
| JP | 2008072733 A | 3/2008 |
| KR | 19960015862 | 11/1996 |
| KR | 0156478 | 11/1998 |
| KR | 100214293 | 5/1999 |
| KR | 20020074739 A | 10/2002 |
| KR | 20020076991 | 10/2002 |
| KR | 20020085674 A | 11/2002 |
| KR | 20020089164 | 11/2002 |
| KR | 20020092136 | 12/2002 |
| KR | 100406531 | 11/2003 |
| RU | 2073913 | 2/1997 |
| RU | 2115246 | 7/1998 |
| RU | 2120198 | 10/1998 |
| RU | 2142672 | 12/1999 |
| RU | 2149518 | 5/2000 |
| RU | 2183910 | 6/2002 |
| RU | 2189696 | 9/2002 |
| TW | 477129 | 2/2002 |
| TW | 481963 | 4/2002 |
| TW | 504914 | 10/2002 |
| WO | WO-9205556 | 4/1992 |
| WO | WO-1992010890 | 6/1992 |
| WO | WO-1995007578 | 3/1995 |
| WO | WO-9510144 | 4/1995 |
| WO | WO-1995012297 | 5/1995 |
| WO | WO-9701256 | 1/1997 |
| WO | WO-9733399 | 9/1997 |
| WO | WO-1998035525 | 8/1998 |
| WO | WO-1998036606 | 8/1998 |
| WO | WO-1998045966 | 10/1998 |
| WO | WO-1998052365 | 11/1998 |
| WO | WO-9904525 | 1/1999 |
| WO | WO-1999001994 | 1/1999 |
| WO | WO-9907089 | 2/1999 |
| WO | WO-9907170 A2 | 2/1999 |
| WO | WO-9912282 A1 | 3/1999 |
| WO | WO-1999014878 | 3/1999 |
| WO | WO-1999026371 | 5/1999 |
| WO | WO-9929054 | 6/1999 |
| WO | WO-0008869 A2 | 2/2000 |
| WO | WO-0038368 A1 | 6/2000 |
| WO | WO-0038444 | 6/2000 |
| WO | WO-2000033480 | 6/2000 |
| WO | WO-0042752 | 7/2000 |
| WO | WO-0048328 A1 | 8/2000 |
| WO | WO-2000054437 | 9/2000 |
| WO | WO-0065743 | 11/2000 |
| WO | WO-2000072622 | 11/2000 |
| WO | WO-0106714 | 1/2001 |
| WO | WO-2001010159 | 2/2001 |
| WO | WO-2001017158 | 3/2001 |
| WO | WO-2001024568 | 4/2001 |
| WO | WO-2001028127 | 4/2001 |
| WO | WO-2001028194 | 4/2001 |
| WO | WO-0141318 | 6/2001 |
| WO | WO-2001080475 | 10/2001 |
| WO | WO-2001080477 | 10/2001 |
| WO | WO-0199312 | 12/2001 |
| WO | WO-2001099303 | 12/2001 |
| WO | WO-0201762 | 1/2002 |
| WO | WO-2002007372 | 1/2002 |
| WO | WO-0221729 A2 | 3/2002 |
| WO | WO-0223792 A1 | 3/2002 |
| WO | WO-0231991 | 4/2002 |
| WO | WO-02033838 | 4/2002 |
| WO | WO-0237693 | 5/2002 |
| WO | WO-0237872 A2 | 5/2002 |
| WO | WO-2002039595 | 5/2002 |
| WO | WO-2002041531 | 5/2002 |
| WO | WO-0249305 A2 | 6/2002 |
| WO | WO-2002045327 | 6/2002 |
| WO | WO-02060142 A2 | 8/2002 |
| WO | WO-2002063818 | 8/2002 |
| WO | WO-2002065664 | 8/2002 |
| WO | WO-02082108 A1 | 10/2002 |
| WO | WO-02082704 A1 | 10/2002 |
| WO | WO-2002080400 | 10/2002 |
| WO | WO-2002095960 | 11/2002 |
| WO | WO-03007530 A2 | 1/2003 |
| WO | WO-2003003592 | 1/2003 |
| WO | WO-03028251 A1 | 4/2003 |
| WO | WO-03084163 | 10/2003 |
| WO | WO-2004082165 A2 | 9/2004 |
| WO | WO-2005015942 A1 | 2/2005 |

OTHER PUBLICATIONS

3G TS 25.212 "Multiplexing and channel coding (FDD)", Release 5, V5.0.0, Mar. 2002.
3G TS 25.213 "Spreading and modulation (FDD)", Release 5, V5.0.0, Mar. 2002.

(56) References Cited

OTHER PUBLICATIONS

3G TS 25.214 "Physical layer procedures (FDD)", Release 5, V5.0.0, Mar. 2002.
3GPP2 C.S0024: "cdma2000 High Rate Packet Data Air Interface Specification" 3GPP Standards, Sep. 12, 2000, XP002206456.
3GPP2 C.S0024, Version 2.0: "cdma2000 High Rate Packet Data Air Interface Specification," pp. 1-441 (Oct. 27, 2000).
3rd Generation Partnership Proect, Technical Specification Group Radio Access Network: 3GPP TS 25.322 V4.7.0; Radio Access Link Control (RLC) Protocol Specification; Release 4, Dec. 2002, pp. 1-76.
Adachi, F., et al., "Wideband Multi-rate DS-CDMA for Next Generation Mobile Communications Systems," Wireless Communications Conference (1997). Boulder, CO, USA Aug. 11-13, 1997, New York, NY, USA, IEEE, (Aug. 11, 1997), pp. 57-62, XP010245557, DOI:10.1109/WCC.1997.622247, ISBN: 978-0-7803-41 94-4.
Attar, R. A., et al.: "A Reverse Link Outer-Loop Power Control Algorithm for CDMA2000 1xEV Systems," ICC 2002. 2002 IEEE International Conference on Communications. Conference Proceedings. New York, NY, Apr. 28-May 2, 2002, New York, NY: IEEE, US, vol. 1 of 5, Apr. 28, 2002, pp. 573-578, XP010589559, ISBN: 0-7803-7400-2.
Balasubramanian S. et al., "QoS support for Enhanced Reverse Link-Control and Feedback", 3GPP2-DRAFTs, 2500 Wilson Boulevard, Suite 300, Arlington, Virginia 22201 USA, [Online] Sep. 15, 2003 (Sep. 15, 2003), pp. 1-18, XP040345576, Retrieved from the Internet: URL:http:l/ftp.3gpp2.org/TSGC/working/2003/2003-09-Calagry/TSGC-0309 Calgary/WG3/[retrieved on Sep. 18, 2012).
Brouwer A. E. et al., "An Updated Table of Minimum-Distance Bounds for Binary Linear Codes" IEEE Transactions on Information Theory, IEEE Service Center, Piscataway, NJ, US, vol. 39, No. 2, Mar. 1, 1993 (Mar. 1, 1993) pp. 662-677, XP000377724 ISSN: 0018-9448.
Chakravarty S. et al., "An Algorithm for Reverse Traffic Channel Rate Control for cdma2000 High Rate Packet Data Systems" IEEE Global Telecommunications Conference, 2001. San Antonio, TX, Nov. 25-29, 2001, New York, NY : IEEE, US, vol. 6 of 6, (Nov. 25, 2001), pp. 3733-3737, XP002277693.
Chen, Tau, "Method and Apparatus for Forward Link Power Control During Soft Handoff in a Communication System", U.S. Appl. No. 60/356,929 entitled, filed Feb. 12, 2002, QUALCOMM Incorporated.
Chung Y. et al., "An Efficient Reverse Link Data Rate Control Scheme for 1xEV-DV System," IEEE 54th Vehnicular Technology Conference Proceedings: Atlantic City, NJ, Oct. 7-11, 2001. vol. 1 of 4, Conf. 54, Oct. 10, 2001, pp. 820-823.
Co-pending U.S. Appl. No. 08/118,473, filed Sep. 8, 1993.
Co-pending U.S. Appl. No. 08/144,901, filed Oct. 28, 1993.
Co-pending U.S. Appl. No. 08/856,428, filed May 14, 1997.
Co-pending U.S. Appl. No. 09/615,354, filed Jul. 13, 2000.
Co-pending U.S. Appl. No. 60/356,929, filed Feb. 12, 2002.
Dennett, Steve: "The cdma2000 ITU-R RTT Candidate Submission (0.18)," Telecommunications Industry Association (TIA), Jul. 27, 1998, XP002294165, pp. 1-145.
ETSI TS 125 211 v 5.3.0: "Universal Mobile Telecommunications System (UMTS); Physical channels and mapping of transport channels onto physical channels (FDD) (3GPP TS 25.211 version 5.3.0 Release 5)", 3GPP, Dec. 2002, pp. 1-52.
ETSI TS 125.211 v3.5.0 (Dec. 2000);Universal Mobile Telecommunications Systems (UMTS); Physical channels and mapping of transport channels onto physical channels (FDD), 3GPP TS 25.211 version 3.5.0 Release 1999).
Fujii, T., et al., "Best Effort Cell Structure Using Sub-carrier Selected MC-CDMA System," The Institute of Electronics, Information and Communication Engineers, Nov. 15, 2002, vol. 102, No. 465, pp. 65-72, IEICE Technical Report RCS 2002-203 (English Abstract).
Hamaguchi et al., "Characteristics of Orthogonal Slow-FH/16QAM System with an Interference Immunity Decoding Method for Digital Land Mobile Communications", The Journal of the Institute of Electronics, Information and Communication Engineers B-II, Jun. 25, 1995, vol. J78, B-II, No. 6, pp. 445-453.
Hwang, Gyung-Ho et al.: "Distributed Rate Control for Throughput Maximization and QoS Support in WCDMA System," IEEE VTS 54th Vehicular Technology Conference, 2001: Atlantic City, NJ, USA, (Oct. 7, 2001), vol. 3, pp. 1721-1725, doi: 10.1109/VTC.2001.956494.
International Search Report—PCT/US04/004668, International Search Authority—European Patent Office—dated Sep. 27, 2004.
MacWilliams F. J., et al., "The Theory of Error-Correcting Codes, pp. 23, 24"1977, North-Holland, Amsterdam, XP002366024.
Morelos-Zaragoza R. H.: "The Art of Error Correcting Coding, pp. 101-120" 2002, John Wiley and Sons, New York, XP002366026.
Morelos-Zaragoza R. H., "The Art of Error Correcting Coding, pp. 16,35" 2002, John Wiley and Sons, New York, XP002366025.
Nandagopal, T. et al.: "Service Differentiation Through End-To-End Rate Control in Low Bandwith Wireless Packet Networks," 1999 IEEE International Workshop. San Diego, CA USA (Nov. 15-17, 1999), Mobile Mutlimedia Communications, pp. 211-220.
Oguz Sunay M., et al., "Provision of Variable Data Rates in Third Generation Wideband DS CDMA Sytems" Wireless Communications and Networking Conference, 1999. WCNC. 1999 IEEE New Orleans, LA, USA, Sep. 21-24, 1999, pp. 505-509, XP010353838.
Sarkar, S. et al.: "Adaptive Control of the Reverse Link in CDMA2000," International Journal of Wireless Information Networks, Plenum Press: NY, US, vol. 9, No. 1, (Jan. 1, 2002), pp. 55-70, XP002300880, ISSN: 1068-9605, p. 56, right-hand column, line 12—p. 61, right-hand column, line 4, p. 63, left-hand column.
Sarkar S., et al., "CDMA2000 Reverse Link: Design and System Performance" VTC 2000-Fall. IEEE VTS 52nd, Vehicular Technology Conference, Boston, MA, Sep. 24-28, 2000. vol. 6 of 6 Conf. 52, pp. 2713-2719,XP010525079.
Sarkar, Sandip (QUALCOMM), et al., "Forward Link Channels Required to Support the Reverse Link", C50-20011203-044_QCOM_FLChannelsForDVRL, 2001 .
Sarkar, Sandip (QUALCOMM), "Forward Link Loading Calculations", C50-RLAH-20020107-003_QCOM+FL_loading, Jan. 2002.
Schreiber, W. F: "Spread- Spectrum Television Broadcasting", SMPTE Journal, SMPTE Inc. Scarsdale, N.Y, US, vol. 101, No. 8, Aug. 1, 1992 (Aug. 1, 1992), pp. 538-549, XP000296026, ISSN: 0036-1682.
Sklar, B. "Digital Communications, Fundamentals and Applications", 4 pages, 2001. Prentice-Hall PTR. Upper Saddle River, New Jersey, USA.
Sohn, I. et al.: "Blind Rate Detection Algorithm in WCDMA Mobile Receiver," IEEE 54th Vehicular Technology Conference Proceedings, Atlantic City, NJ, Oct. 7, 2001, pp. 1589-1592, XP010562230.
Song, Young-Joo et al.: "Rate-control Snoop : A Reliable Transport Protocol for Heterogeneous Networks with Wired and Wireless Links," IEEE Proceedings 2003, vol. 2, Mar. 16, 2003, pp. 1334-1338.
Soong, A., "Reverse Link enhancements for CDMA2000 1x Revision D (E-REX) R1 ", 3GPP2-DRAFTS, 2500 Wilson Boulevard, Suite300, Arlington, Virginia 22201 USA, [Online] Feb. 17, 2003 (Feb. 17, 2003), pp. 1-14, XP040264591, Retrieved from the Internet:URL:http://ftp.3gpp2.org/TSGC/working/2003/2003-02-LosAngelas/TSG-C-2003-02-LA/WG3/[retrieved on Sep. 18, 2012].
Strawczynski Leo et al., "Multi User Frame Structure for 1XEV Forward Link," 3GPP2 cdma2000 TSG-C, Nortel Networks, 2000, pp. 1-6.
Taiwanese Search report—093103849—TIPO—Nov. 20, 2010.
TIA EIA interim Standard IS-856-1, 'CDMA.2000 High Rate Packet Data Air Interface Specification,' Addendum 1, Jan. 2002. pp. 9-23-9-57, XP002299790.
TIA/EIA-95-B: "Mobile Station-Base Station Compatibility Standard for Wideband Spread Spectrum Cellular Systems," TIA/EIA Interim Standard, Feb. 3, 1999, XP002145331, pp. 6-380 .
TIA/EIA-IS-2000 Release C, "Introduction to cdma2000 Standards for Spread Spectrum Systems, Release C" (3GPP2 C.S0001-C, Version 1.0) May 28, 2002.

(56) References Cited

OTHER PUBLICATIONS

Tiedemann, et al., "Reverse Link Channel Architecture for a Wireless Communication System," U.S. Patent Publication No. US 2002/0154610, Oct. 24, 2002.
Wei Y., et al., "Qualcomm's Interpretation of the MAC Logic for the Harmonized Control Mechanism", 3GPP2-DRAFTS, 2500 Wilson Boulevard, Suite 300, Arlington, Virginia 22201 USA, [Online] Aug. 18, 2003 (Aug. 18, 2003), pp. 1-9, XP040264988, Retrieved from the Internet: URL:http://ftp.3gpp2.org/TSGC/working/2003/2003-08-Seoui/TSG-C-2003-08-Seou I/WG3/C30-20030818-067-Detai led%20Control%20Mechanism.pdf[retrieved on Sep. 18, 2012].
Written Opinion—PCT/US04/004668, International Search Authority—European Patent Office—dated Sep. 27, 2004.
Yoon Y.C., et al.,"Reverse Link Enhancements for CDMA2000 1x Revision D (E-REX) R2", 3GPP2-DRAFTS, 2500 Wilson Boulevard, Suite 300, Arlington, Virginia 22201 USA, Aug. 18, 2003 (Aug. 18, 2003), pp. 1-38, XP040264985, Retrieved from the Internet: URL:http://ftp.3gpp2.org/TSGC/working/2003/2003-08-Seoul/TSG-C-2003-08 Seoui/WG3/C30-20030818-012%20 E-REX%2011%20writeup.pdf [retrieved on Sep. 18, 2012].
You, Young-Hwan et al.: "MC-VSG BNET System for High-Rate Wireless Personal Area Network Applications," New York, US, IEEE Transactions on Consumer Electronics, vol. 48, No. 2, May 2002, pp. 254-264, XP001200452.
Huang C.Y., et al., "Forward and Reverse Link Capacity for lxEV-DO: Third Generation Wireless High-Speed Data Systems," IEEE Global Telecommunications Conference (2002), Nov. 17-21, 2002, pp. 871-875.

\* cited by examiner

For example, the MS may determine a Congestion (Level 1) Rate based on dropping the first packet...

...and a Congestion (Level 2) Rate based on dropping the largest packet.

|                      | Current Grant | Request |
|----------------------|---------------|---------|
|                      | ------------- | 11      |
| Required T/P         | ───────────── |         |
|                      | ------------- | 10      |
| Congestion Level 1 T/P | ───────────── |         |
|                      | ------------- | 01      |
| Congestion Level 2 T/P | ───────────── |         |
|                      | ------------- | 00      |

The T/P Request indicates the level of the Current Grant to the MS with respect to the Required T/P and the Congestion T/P.

Encoding of 2-bit Differential T/P Request Field

FIG. 3C

|                    | Current Grant | Request |
|--------------------|---------------|---------|
|                    | ------------- | 11      |
| T/P can be reduced | ───────────── |         |
|                    | ------------- | 10      |
| Required T/P       | ───────────── |         |
|                    | ------------- | 01      |
| Congestion Level T/P | ───────────── |         |
|                    | ------------- | 00      |

The T/P Request indicates the level of the Current Grant to the MS with respect to the Required T/P, the Congestion T/P and T/P that can create buffer underflow.

Alternative Encoding of 2-bit Differential T/P Request Field

FIG. 3D

METHOD AND APPARATUS FOR CONTROLLING DATA RATE OF A REVERSE LINK IN A COMMUNICATION SYSTEM

CLAIM OF PRIORITY UNDER 35 U.S.C. §119

The present Application for Patent claims priority to U.S. patent application Ser. No. 10/628,955, entitled "Method and Apparatus for Controlling Data Rate of a Reverse Link in a Communication System," filed Jul. 28, 2003, which claims priority to Provisional Application No. 60/448,269, entitled "Reverse Link Data Communication," filed Feb. 18, 2003, and Provisional Application No. 60/469,376, entitled "Method and Apparatus for Controlling Data Rate of a Reverse Link in a Communication System," filed May 9, 2003, each of which are assigned to the assignee hereof and hereby expressly incorporated by reference herein.

FIELD

The present invention relates generally to the field of communications, and more particularly, to controlling data rate of a reverse link from a mobile station in a communication system.

BACKGROUND

In a wireless communication system, unnecessary and excessive transmissions by a user may cause interference for other users in addition to reducing the system capacity. The unnecessary and excessive transmission may be caused by inefficient selection of data rate of a reverse link in the communication system. The data communicated between two end users may pass through several layers of protocols for assuring proper flow of data through the system. Normally, a mobile station receives blocks of data from an application for transmission on a reverse link. The block of data is divided into a number of frames and transmitted over the communication link. The proper delivery of data in at least one aspect is assured through a system of checking for error in each frame of data, and requesting a retransmission of the same frame of data if an unacceptable error or error rate is detected in the frame of data. The blocks of data may be of any type, for example, music data, video data, etc. The blocks of data may have different size and different delivery requirements. Such data delivery requirements often are associated with a quality of service. The quality of service may be measured by the communication data rate, the rate of packet loss that may be acceptable to the service, consistency in time delay of the data delivery, and an acceptable maximum delay for the communication of the data. Very often, if the data rate selected for transmission is not adequate, the required packet loss and the communication delay parameters may not be achieved.

On a forward link communication, the base station very often has adequate information about forward link quality with a number of mobile stations. As such, the base station may be able to centrally manage the forward link communication data rates. However, on the reverse link, a mobile station has no information about the transmissions from other mobile stations. Therefore, the mobile station may make a request to get permission to transmit at a data rate. The base station after reviewing every mobile station requests, accepts or rejects the requested data rate. If the requested data rate is rejected, the mobile station may request a lower data rate until the base station accepts a requested data rate. The mobile station may have permission to transmit below a data rate without going through the request and acceptance process. Such a data rate is normally a very low data rate. Before transmission on the reverse link, the mobile station needs to have completed its communication for the data rate request. Such overhead communications between the mobile stations and the base stations may reach an unacceptable level and impact the desired quality of service.

Therefore, there is a need to provide a system, method and apparatus for selection of a reverse link data rate in a communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3C illustrates an encoding of a 2-bit Differential Rate Request field.

FIG. 3D illustrates an alternative encoding of a 2-bit Differential Rate Request field.

DETAILED DESCRIPTION OF THE PREFERRED EMBODIMENT(S)

One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
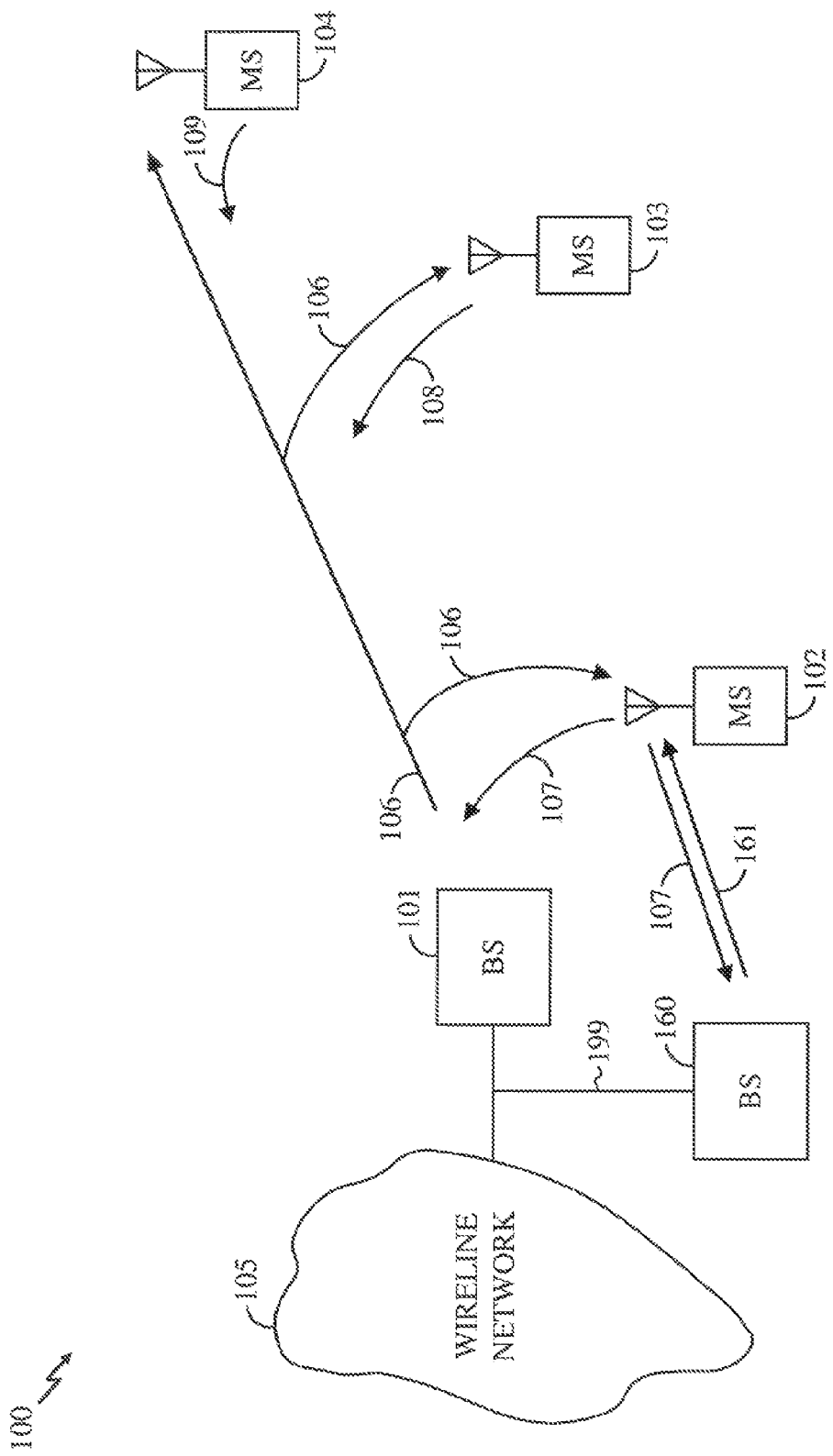
FIG. 1 depicts a communication system for transmitting and receiving data in accordance with various aspects of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as a data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102-104 may be summed to form a forward link signal 106. The forward link may carry a number of different forward link channels. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102-104 may communicate with base stations 101 and 160 via corresponding reverse links. Each reverse link is maintained by a reverse link signal, such as reverse link signals 107-109 for respectively mobile stations 102-104. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station as outlined by various aspects of the invention.

Figure 2:
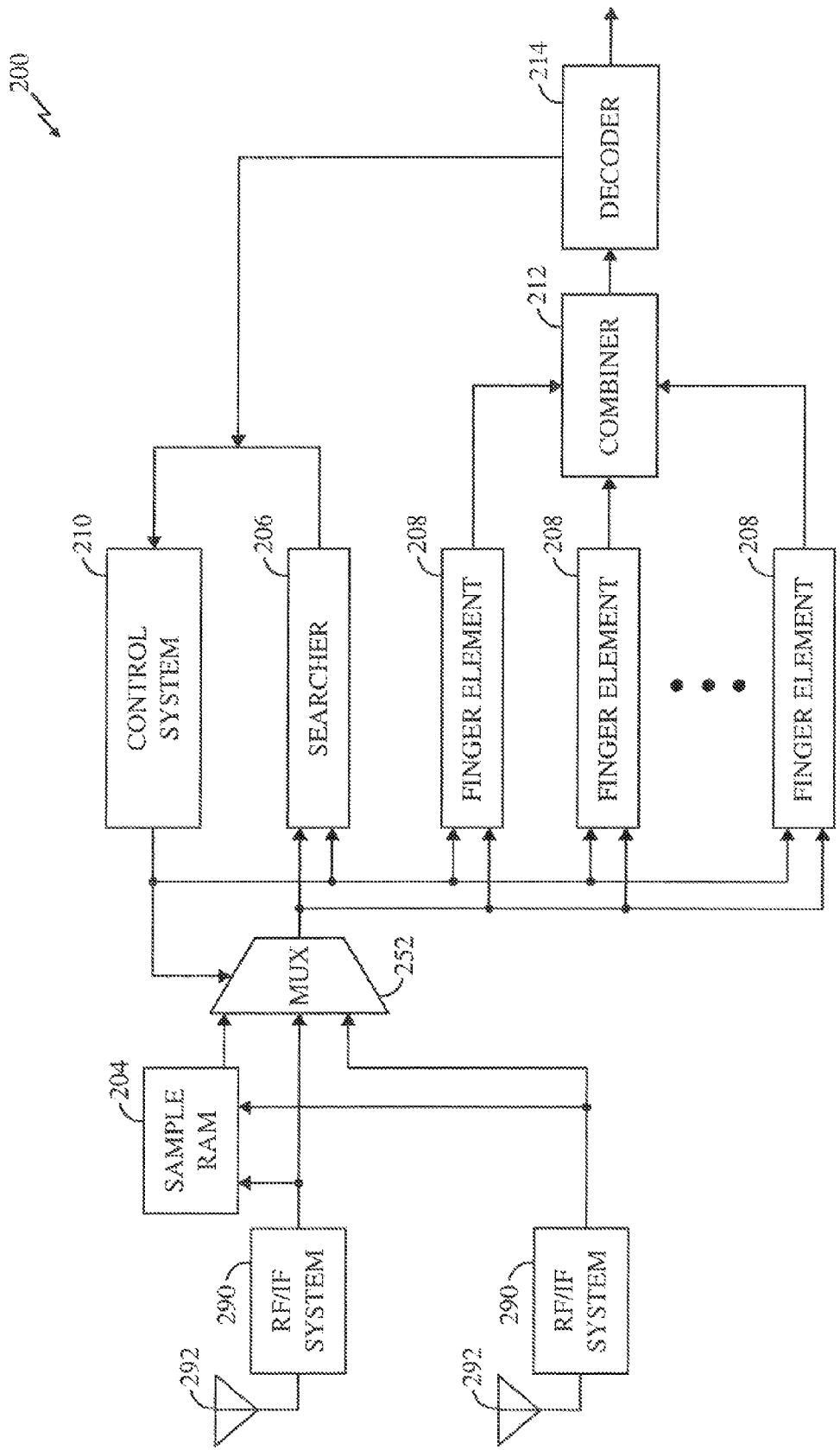
FIG. 2 depicts a receiver system for receiving data in accordance with various aspects of the invention.

FIG. 2 illustrates a block diagram of a receiver 200 used for processing and demodulating the received CDMA signal while operating in accordance with various aspects of the invention. Receiver 200 may be used for decoding the information on the reverse and forward links signals. Receiver 200 may be used for decoding information on the fundamental channel, control channel and supplemental channels. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, downconverted and digitized to form RX samples at base band frequencies. The samples are supplied to a multiplexer (mux) 252. The output of mux 252 is supplied to a searcher unit 206 and finger elements 208. A control system 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms. The signal transmitted from a source may be encoded with several layers of codes. The decoder 214 may perform decoding function in accordance with two or more codes. For example, the transmitted data may be encoded at two different layers, an outer layer and a physical layer. The physical layer may be in accordance with the Turbo code, and the outer layer may be in accordance with Reed Solomon code. As such, the decoder 214 decodes the received samples in accordance with such codes.

During operation, received samples are supplied to mux 252. Mux 252 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

The decoder 214 may accumulate the combined energy for detection of a data symbol. Each packet of data may carry a cyclic redundancy check (CRC) field. The decoder 214 may in connection with control system 210 and or other control systems check for error in the received data packet. If the CRC data does not pass, the received packet of data has been received in error. The control system 210 and or other control systems may send a negative acknowledgment message to the transmitter to retransmit the packet of data.

Figure 3:
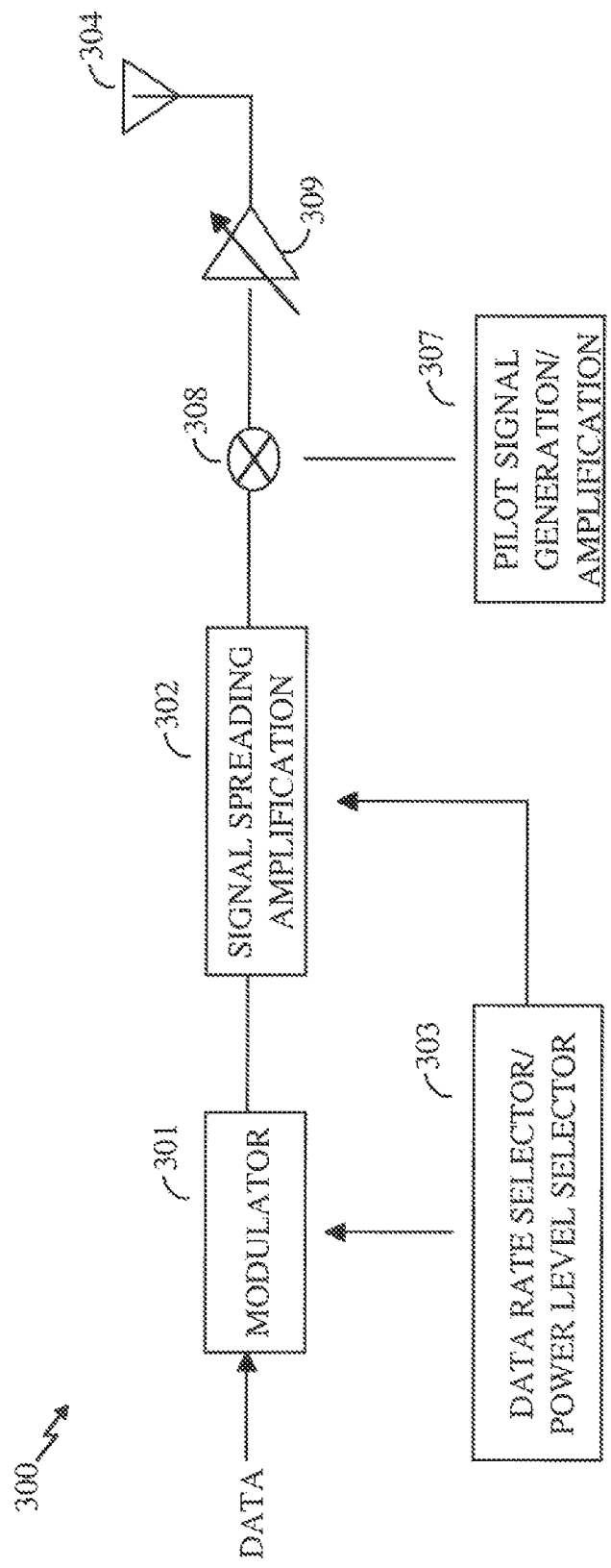
FIG. 3 depicts a transmitter system for transmitting data in accordance with various aspects of the invention.

FIG. 3 illustrates a block diagram of a transmitter 300 for transmitting the reverse and forward link signals. The channel data for transmission are input to a modulator 301 for modulation. The modulation may be according to any of the commonly known modulation techniques such as QAM, PSK or BPSK. Before modulation, the channel data for transmission may pass through one or more layers of coding. The channel data for transmission are produced for modulator 301. The channel data for transmission are received by the modulator 301.

The modulation data rate may be selected by a data rate and power level selector 303. The data rate selection may be based on feedback information received from a destination. The data rate very often is based on the channel condition, among other considered factors and in accordance with various aspects of the invention. The channel condition may change from time to time. The data rate selection may also change from time to time.

The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal may be combined with the channel signal in a combiner 308. The combined signal may be amplified in an amplifier 309 and transmitted from antenna 304. The antenna 304 may be in any number of combinations including antenna arrays and multiple input multiple output configurations.

In CDMA 2000 system, the mobile station (MS) is permitted to have several simultaneous communication services. Each one of the communication services may have different quality of service (QoS) requirements. For a service option, packets of data may be communicated with the specifically defined QoS parameters such as a specific data rate or a range of data rates, a packet loss rate and a maximum delay allowed for communication of data packet or a number of data packets. During the service negotiation phase of a communication link, MS and the base station (BS) agree on a set of QoS parameters. The QoS parameters may be defined for duration of a defined communication service. The BS then may be required to meet such negotiated QoS such as the date rate, packet loss and maximum delay with high probability.

In accordance with various aspects of the invention, a method and apparatus provide for an implementation of a QoS on the reverse link, where an updated information relating to the queue length and packet delay deadlines are available at the MS, while the resource manager allocating the negotiated QoS is at the BS. The MS requests a required rate from the BS rather than reporting its queue length (backlog) information. The MS computes the required data rate and duration before requesting the data rate from the BS. The request for the data rate may be in the form of requesting one or more forward link traffic channel power to pilot (T/P) ratio. The set of available data rates may have corresponding T/P ratios. A table may provide for the correspondence between the T/P and the data rate. The autonomous data rate control by the MS may also be based on a congestion feedback from the BS. The BS may be responsible for allocating rate to the MS's and for congestion management and stability of the reverse link. The BS is also responsible for admission control. The allocation of resources in response to a data rate request may be depicted in the graphical flow of messages and processes illustrated in FIG. 3A.

Figure 3A:
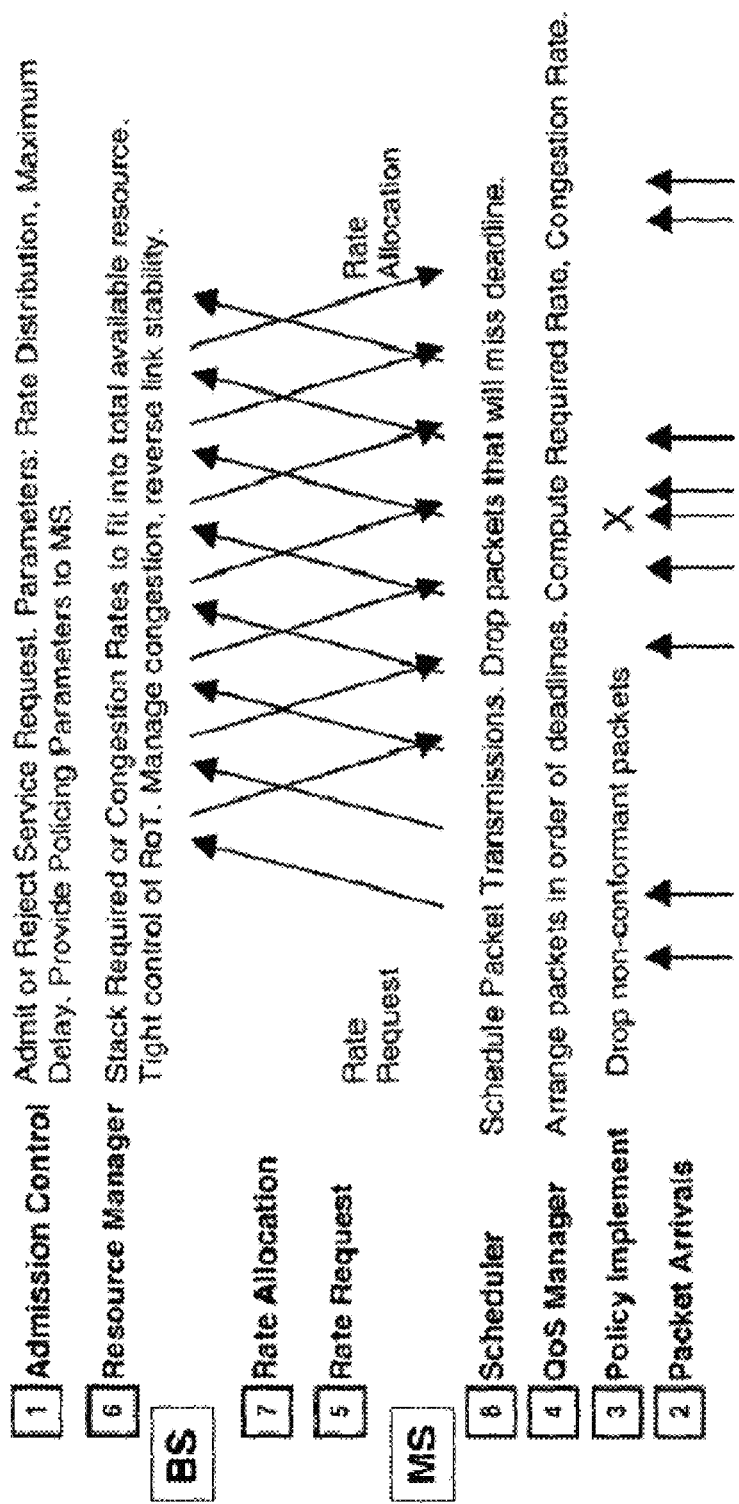
FIG. 3A illustrates an exemplary process for the allocation of resources in response to a data rate request.

The actual resource managed by the BS is the traffic channel to pilot power ratio (T/P). The mapping from data rate to T/P of the channel is the operating point that is chosen based on the number of permitted retransmissions and the use of hybrid ARQ. The BS may assign a different mapping as a function of the delay requirement (permitted retransmissions) for each service. Such an optimization is useful for services with short transactions and very low delay requirements (e.g., interactive gaming). For most services, the best choice is for the BS to choose the mapping that maximizes reverse link throughput. The numbers (1-8) on the left hand side of FIG. 3A represent a possible order of events or processes that may take place.

1. The BS manages admission control and only admits the communication service (or flows) with acceptable and achievable QoS requirements. Once a service or communication flow of data packets is admitted, the MS is aware of the negotiated QoS parameters, such as acceptable data rate, packet loss rate and maximum delay associated with the flow. Note that due to channel variations and mobility, these QoS guarantees are necessarily probabilistic.

2. The MS implements an (upstream) policy that discards non-conformant data packets at the ingress. Thus, the MS accepts all packets that by the implementation of the policy are assumed to meet the negotiated QoS for the admitted flows. The packets that require a QoS exceeding the negotiated QoS as defined by for example communication data rate are discarded at the MS prior to the output queuing stage. The MS may also implement an outer-loop mechanism to adjust the policing parameters based on operating conditions. The BS may "verify" that the MS is actually conforming to its negotiated rate.

3. Conformant packets admitted at the MS are placed in the output queue. A deadline is associated with each packet based on the packet arrival time and the maximum permitted delay for that service (or flow). Preferably, the MS may arrange the output queue so that the packets are stored in the order of their deadlines, the earliest deadline first. The MS must manage its transmission schedule to ensure that packets are transmitted before their deadline.

4. The MS determines a required data rate based on the deadlines associated with the packets in the output queue. The procedure is described below more fully. Since the data rate determined by the MS is required to meet the negotiated QoS, the requested data rate is not just a "priority" indication. The MS also computes one or more congestion data rates by determining what packets in its queue may be dropped to assist the BS in making an allocation lower than the required rate, if the required rate cannot be allocated due to congestion, overload control or any other reason, by the base station. The congestion rates are determined by the MS based on the required rate and the number of packets that may be dropped in the queue. Generally, when a packet is dropped from the queue, the data rate needed to transmit the remaining number of packets decreases. The BS translates the required and congestion rates to the required and congestion T/P, or alternately the MS can directly compute a required and congestion T/P.

5. The MS communicates the required and congestion T/P or T/P increment or decrement and communicates it to the BS. The BS must attempt to meet requests for T/P increases subject to available resources since these resources are required by the MS to meet its QoS criteria. Several consecutive T/P increase requests from the MS indicates increasing priority, which if not satisfied would result in some QoS criteria not being satisfied.

6. The BS scheduler stacks these T/P requests in terms of reverse link resources (i.e., rise over thermal) and time. The BS also sets aside certain resources for known low delay, constant bandwidth flows e.g., voice calls. The BS may attempt to optimize such a stacking, e.g., by delaying certain T/P allocations or providing higher T/P allocation for shorter duration. If the BS delays an allocation to the MS, subsequent requests from the MS may request even higher T/P to satisfy the QoS for delay-sensitive packets, because the longer the delay in transmitting a data packet, the higher the date rate required for transmission to meet the same QoS. Thus, the BS has limited flexibility in scheduling. If there is an excess bandwidth available, the BS may choose to ignore requests for T/P decreases, or provide higher than requested T/P.

7. The BS makes T/P allocation to the MS. The allocation may be indicated to the MS as an increment (or decrement) to a current data rate allocation.

8. Based on the T/P allocation, the MS schedules packets for transmission. The MS serves packets based on earliest-deadline-first scheduling discipline, and may be subject to a modification. For example, prior to starting the transmission of any packet, the MS determines if the transmission of the data packet takes place within its deadline. This determination is a function of the allocated T/P and the deadline and should account for the potential for an increased allocation in the future. The MS drops any packet that is likely to miss its transmission deadline. A packet that is not successfully transmitted prior to the expiry of its deadline is counted as lost. The MS tracks the packet loss rate associated with the flow.

In such a framework, the processes of time steps 2, 3 and 8, respectively, allow the MS to manage the QoS (rate, maximum delay and packet loss guarantees) associated with its flows. The processes of time steps 4 and 5 allow the MS to merge its needs for all its flows into one T/P requirement. The BS admission control process at time step 1 ensures that the BS would have enough resources in time step 6 to satisfy the requirements of all admitted, negotiated QoS flows from all MS's. The MS determines the required data rate to satisfy the QoS. The MS merges queues for multiple (negotiated QoS) services into a rate requirement. Moreover, generally, instead of determining required rate and translating to a required T/P, the MS can work directly with required T/P. This is more general, since it easily accommodates the transmission of packets from different services with different mappings from T/P to rate.

Let us assume that at time $t_0$, the MS queues consist of packets $P_i$, $\{i=1, \ldots, N\}$ of size $s_i$, arranged in order of their deadlines $d_i$. Each packet $P_i$ is associated with a data service k(i). For data service k, the known data rate to T/P map is defined as: $R_k(T/P)$. Then, at the allocated T/P value $T_0$, the following equations may be defined and determined. At rate $R_{k(i)}(T_0)$, the transmission time of packet $P_i$ over the air, $x_i$ is $$x_i = s_i / R_{k(i)}(T_0), \tag{1}$$

Since the packets have been arranged in order of their deadlines, packet $P_i$ will complete its transmission at $$z_i = t_0 + \Sigma s_j / R_{k(j)}(T_0), \text{ where the sum is over } [1, \ldots, i]. \tag{2}$$

That is, packets $P_1, \ldots, P_{i-1}$, with deadlines prior to $d_i$ are transmitted before $P_i$. Thus, the process may determine if any packet in the MS output queue would miss its deadline, i.e.

$$z_i > d_i, \text{ for } 1 \leq i \leq N \tag{3}$$

If the MS determines that any packet in its queue would miss its deadline at a current rate, then it may require a higher rate to satisfy its QoS. Note: such a data rate computation uses the deadline information associated with every packet in the MS queue. The BS is unable to make such a data rate determination based on just the backlog and QoS class.

There may be several ways of providing the required T/P information to the BS. Depending on the design of the request channel and the frequency of transmission of request information from the MS to BS, it may also be useful to compute a required duration at the MS and provide an indication to the BS. The above equation 2 also allows the MS to determine the required duration. Basically, at the allocated T/P ratio $T_0$, the last packet in the MS queue would complete its transmission at time $z_N$. Therefore, based on the current packet queue and the allocated rate, the required duration is $z_N$. The equation 2 may be updated with very little computation burden. For example, if at a subsequent time $t_1$ at the completion of the transmission of packet $P_1$, the allocated T/P has changed to $T_1$, the updated packet completion instants are written as:

$$z_i(t_1) = t_1 + \Sigma s_j / R_{k(j)}(T_1), \text{ where the sum is over } [2, \ldots, i]. \tag{4}$$

These completion times can be computed from the previous packet completion times using the equation:

$$z_i(t_1) - t_1 = z_i(t_0) - t_0 - s_1 / R_{k(1)}(T_0) + \Sigma s_j [1/R_{k(j)})(T_1) - 1/R_{k(j)}(T_0)] \tag{5}$$

Next, assume that a new packet $P_{new}$ of size $s_{new}$, service k(new) and deadline $d_{new}$ arrives at time $t_2$. In general, the deadline for the new packet is between the (ordered) deadlines for packets k and k+1, i.e. for some k<N, $d_k \leq d_{new} < d_{k+1}$. Then, for $i \leq k$, $z_i(t_2)$ is unchanged. If the T/P value $T_1$ is unchanged, $$z_i(t_2) = z_i(t_1) + s_{new} / R_{k(new)}(T_1) \text{ for } i > k \tag{6}$$

Thus, the MS is able to compute and keep updated its required T/P, required duration as well as the transmission schedule of packets in its queue.

To assist the BS in making rate allocations during periods of congestion, the MS also computes congestion rates by determining what packets in its queue may be dropped. The MS may use many criteria to prioritize which packets can be dropped:

Packets from services that are tolerant to dropped packets,
Packets from services whose current packet loss rate is smaller than the negotiated packet loss rate,
Packets that are likely to miss their delay deadline if the required T/P is not allocated.

Based on the drop priority, the MS determines which packets can potentially be dropped while still satisfying an acceptable QoS at various levels of congestion. The MS then applies equations (1) through (3) to a virtual queue formed by removing these packets from the MS queue to compute the congestion T/P values. Note, throughout, the packet data and block of data may be interchangeable.

Figure 3B:
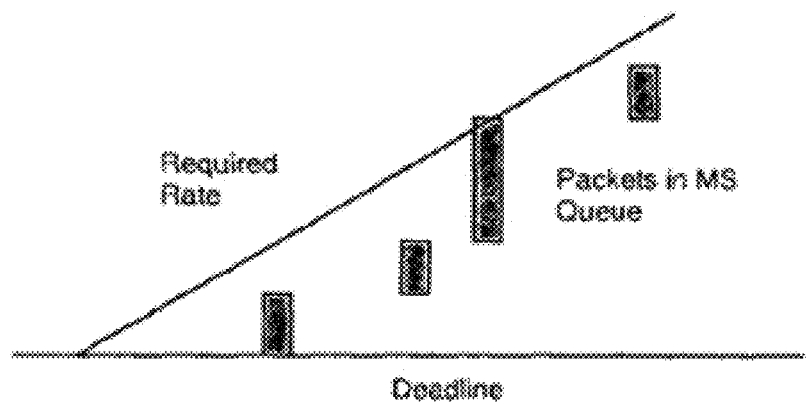
FIG. 3B is a schematic illustrating the required and congestion data rate computations.
Figure 3B:
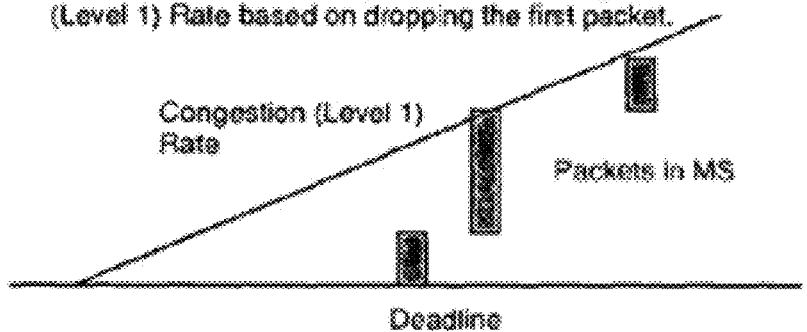
Figure 3B:
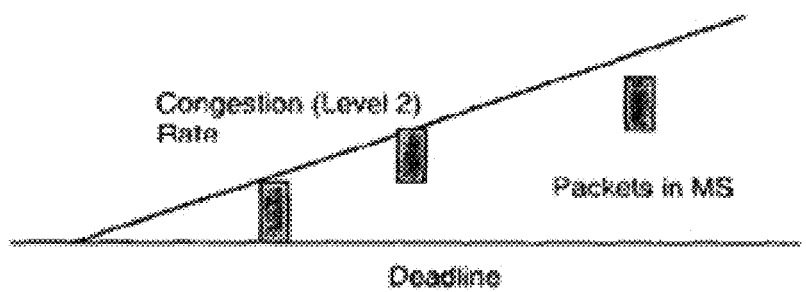

If the T/P to Rate mapping is fixed, it is more convenient and equivalent to work with data rate. A schematic that illustrates graphically, the required and congestion data rate computations is shown in FIG. 3B. The packet sizes and the deadlines are also graphically shown in FIG. 3B. The size of each packet (in bits) is shown as a vertical bar placed at its deadline in a time frame axis. The size of the vertical bar is a representative of the packet size. Any line with positive slope pivoted at the origin corresponds to a rate (in bits/second). The origin is the current time or time of start of allocation. The required rate is the smallest slope that satisfies all deadlines, i.e., the smallest slope such that all the packets in the chart are below the line. Also, where the MS computes the congestion rate assuming that the first packet in the queue can be dropped (congestion level 1) and a congestion rate associated with dropping the largest packet in the queue (congestion level 2).

At time $t_0$, the MS queues consist of packets $P_i$, {i=1, ..., N} of size $s_i$, arranged in order of their deadlines $d_i$. Then, at the allocated rate $R_0$ we can write the following equations. At rate $R_0$, the transmission time of packet $P_i$ over the air, $x_i$ is $$x_i = s_i/R_0 \quad (7)$$

Since the packets have been arranged in order of their deadlines, packet $P_i$ will complete its transmission at $$z_i = t_0 + \Sigma s_j/R_0 \text{ where the sum is over } [1, \ldots, i]. \quad (8)$$

That is, packets $P_1, \ldots, P_{i-1}$, with deadlines prior to $d_i$ are transmitted before $P_i$. Thus, the process may determine if any packet in the MS output queue would miss its deadline, i.e.

$$z_i > d_i, \text{ for } 1 \leq i \leq N \quad (9)$$

If the MS determines that any packet in its queue would miss its deadline, then it requires a higher rate to satisfy its QoS. Such a data rate computation uses the deadline information associated with every packet in the MS queue. The BS is unable to make this rate determination based on just the backlog and QoS class.

There are several ways of providing the required rate information to the BS. Depending on the design of the request channel and the frequency of transmission of request information from the MS to BS, it may also be useful to compute a required duration at the MS and provide an indication to the BS. The above (equation 2) also allows the MS to determine the required duration. Basically, at the allocated rate $R_0$, the last packet in the MS queue would complete its transmission at time $z_N$. Therefore, based on the current packet queue and the allocated rate, the required duration is $z_N$. The equation (2) may be updated with very little computation burden. For example, if at a subsequent time $t_1$ at the completion of the transmission of packet $P_1$, the allocated rate has changed to $R_1$, the updated packet completion instants are written as:

$$z_i(t_1) = t_1 + \Sigma s_j/R_1 \text{ where the sum is over } [2, \ldots, i]. \quad (10)$$

These completion times can be computed from the previous packet completion times using the equation:

$$z_i(t_1) - t_1 = [(z_i(t_0) - t_0)R_0 - s_1]/R_1 \quad (11)$$

Next, assume that a new packet $P_{new}$ of size $s_{new}$ and deadline $d_{new}$ arrives at time $t_2$. In general, the deadline for the new packet may be between the (ordered) deadlines for packets k and k+1, i.e. for some k<N, $d_k \leq d_{new} < d_{k+1}$. Then, for i≤k, $z_i(t_2)$ is unchanged. If the rate $R_1$ is unchanged, $$z_i(t_2) = z_i(t_i) + s_{new}/R_i \text{ for } i>k \quad (12)$$

Thus, the MS is able to compute and keep update its required rate, required duration as well as the transmission schedule of packets in its queue.

As shown above, by examining the delay deadlines of all the packets in the MS buffer, the MS is able to determine a required rate or T/P. Alternatively, if the MS examines only the first packet in its buffer, that is, the packet with the shortest delay deadline, and applies the T/P (or rate) calculations described above, the result is equivalent to delay deadline feedback to the BS. In this case, the value of calculated T/P (or rate) represents the shortest deadline and equivalently highest priority. An example of a two-bit encoding of delay deadlines for the reverse link channel is shown later paragraphs and may be used.

The reverse link requests may be sent to the BS either through messages or using a continuous low-rate rate control channel. The following schemes may be considered and used:

Using a reverse link message to provide queue length or backlog information to the BS. For QoS support, a QoS field may be added to this request message.

A continuous T/P or rate request channel where the MS periodically inserts a bit indicating a request for higher rate. This does not provide the BS any indication of QoS.

The resources managed by the BS include the traffic channel to pilot power ratio (T/P). Generally, a higher T/P ratio maps to a higher data rate. The system may allow more than one mapping scheme between the T/P ratio and the corresponding data rate. In general, the MS always chooses the data rate to T/P mapping that maximizes reverse link throughput. For some services (e.g., interactive gaming) with short transactions and very low delay requirements, it may be necessary to operate with fewer retransmissions and a higher T/P. Thus, if the data packet at the head of the queue at the MS has a very short deadline (e.g., less than 40 ms), the MS may choose a special rate to T/P mapping suitable for low-delay services. It is possible to operate the scheme either using rate, and mapping it to T/P, or directly computing required T/P.

To allow the BS resource manager to prioritize allocation in periods of congestion, in addition to the required T/P, the MS also indicates one or more values of congestion T/P to the BS. The BS attempts to fairly allocate the required T/P to all MS. If the required resources exceeds the available resources, the BS changes the required T/P for one MS at a time (in some order determined by the BS), with a smaller T/P associated with congestion level 1 until the total allocation for all mobile stations falls within the available resources. If necessary, the BS may move on to the T/P associated with congestion level 2, etc. The indication of the required T/P or data rate and congestion T/P or rates may be communicated via short control messages, continuous messaging or a combination.

In the request message to the BS, the required T/P and its duration may be provided based on the computations at the MS. Such a request message may not include the backlog and QoS feedback to the BS. The BS is not able to compute the required T/P and its duration based on the backlog and QoS class. To manage QoS (rate, packet loss, maximum delay), periodic messages that request T/P and its duration are preferable to periodic feedback of backlog and QoS class. In response, the BS makes a T/P and duration allocation to the MS through a grant message. The MS continues to update its (local) rate and duration computation. An updated request is triggered whenever there is either a significant change in the required T/P, or the required duration exceeds the allocated duration by a significant amount. A grant with a zero T/P allocation may indicate the termination of a grant to the MS.

Once a T/P is granted to the MS, to reduce request messaging overhead, a low-bandwidth continuous reverse link request channel may be utilized. The MS maintains a Current Grant variable based on the grant from the BS. Alternately, it is possible that the grant is implicit, that is, any MS is allowed to autonomously set its Current Grant variable to a global (initial) value of Current Grant and thus eliminate the need for any messages.

Based on the required rate computations, the MS continuously sends requests to increase, decrease or leave unchanged its Current Grant. A request for increased T/P may also indicate if the increase is needed to satisfy the T/P at various levels of congestion. An encoding of a 2-bit Differential Rate Request field illustrated in FIG. 3C may be included in the message. The MS indicates the level of its Current Grant with respect to the required rate and congestion rates, for example, if the Current Grant is between the required T/P and the congestion level 1 T/P, then the MS requests includes encoded bit "10". In an alternative, illustrated in FIG. 3D, a 2-bit Differential Rate Request field that contains only 1 congestion level and a new level that prevents buffer underflow for delay sensitive traffic may be included.

Optionally, a look-ahead long grant threshold $D_0$ may also be defined. If the MS computes its required duration exceeds $D_0$, then it may indicate a request for a long grant. This is useful, as it allows the BS to look-ahead and thus better manage its resource allocation and scheduling decisions. For the scheduler, requests for high rate are "priority" requests, while requests for long grant indicate backlog.

Alternately, two bits may be used to represent the delay deadline (or priority level) of the packet at the head of the queue. For example:

| Priority Level | Delay Deadline of head of queue packet |
|---|---|
| 3 | less than X |
| 2 | greater than X, but less than 3X |
| 1 | greater than 3X, but less than 9X |
| 0 | greater than 9X (i.e., best effort) |

X is a system parameter whose value may be fixed for the BS, or may be fixed depending on the mix of services per MS.

The MS transmits on the reverse link using the T/P value Current Grant. The BS determines the value of the Current Grant variable at the MS from the current transmission. The BS may determine this value by measuring the ratio of the traffic channel power to the pilot power in the MS transmission, or from the rate used by the MS for the transmission and then mapping it to T/P.

The BS resource manager uses the current T/P used by the MS, along with the information in the T/P request to allocate T/P fairly among the MS. For example, depending on the level of congestion it may be able to satisfy only the congestion level 1 requirements for all MS. The BS would then allocate T/P increases for MS whose request indicates 00 or 01, with higher priority for MS requests indicating 00. The BS would allocate T/P decreases for MS whose request indicates 11 or 10. The BS may also use additional criteria to manage contention among the MS.

The BS resource manager operation may be explained with a following example. Considering the case of three MS:

MS 1: Ec_Pilot[1], Current Grant [1], Request=10
MS 2: Ec_Pilot[2], Current Grant [2], Request=01
MS 3: Ec_Pilot[3], Current Grant [3], Request=01
MS 4: Ec_Pilot[4], Current Grant [4], Request=11
MS 5: Ec_Pilot[5], Current Grant [5], Request=00
MS 6: Ec_Pilot[6], Current Grant [6], Request=10

Noting the above example, all MS except MS 4 require higher T/P than the Current Grant to meet the required T/P. The MS 4 may be assigned a decrease in its Current Grant. The allocation of increase may or may not be offered to other MS, depending on further computations. The BS resource manager is able to compute the current resource utilization from the Ec_Pilot and Current Grant for each MS, as follows:

$$\text{Resource Utilization} = \Sigma Ec\_\text{Pilot}[i] * [\text{Current Grant}[i]+1] \quad (13)$$

The BS grants an increment (up adjust) or a decrement (down adjust) with respect to the Current Grant. The increment or decrement is a multiplicative factor to the Current Grant whose value Adjust[i] is given by a (1+a) or (1−a), respectively. Then following an allocation, the updated resource utilization can be computed as:

$$\text{Resource Utilization} = \Sigma Ec\_\text{Pilot}[i]*[\text{Adjust}[i]*\text{Current Grant}[i]+1] \quad (14)$$

The resource manager algorithm may proceed through the following steps. It terminates at the step where a set of adjustment values Adjust[i] is found where the updated resource utilization is below the maximum resource utilization threshold Tmax.

Step 1 Assigning decrement to MS 4 and increment to all other MS. Adjust[4]=1−a, Adjust[i]=1+a, for i=1, 2, 3, 5, 6. This allocation attempts to move all MS to meet their required T/P. Determining the updated resource utilization. If the updated resource utilization is below the maximum threshold Tmax, this allocation is permitted and may be assigned. If the resource utilization exceeds Tmax, then move to Step 2.

Step 2 It is not possible to move all MS towards the required T/P. For fairness, the process moves all MS towards the congestion level 1 T/P. This means that in addition to MS 4, MS 1 and 6 can be assigned a down adjust. That is, Adjust[i]=1−a, for i=1, 4, 6 and Adjust[i]=1+a for i=2, 3, 5. Once again, determine if this updated resource allocation is permitted or not, i.e. does not exceed the total allowed allocation. If not permitted, then move to Step 3.

Step 3 It is not possible to move all MS towards the congestion level 1 T/P. For fairness, the process moves all MS towards the congestion level 2 T/P. This means that all MS except MS 5 can be assigned a down adjust. That is, Adjust[i]=1−a, for i=1, 2, 3, 4, 6 and Adjust[5]=1+a. Once again, determining if this updated resource allocation is permitted or not i.e. does not exceed the total allowed allocation. If not permitted, then move to Step 4.

Step 4 The BS T/P adjustment algorithm is unable to determine a satisfactory allocation. An explicit message may be required to terminate the transmission from one or MS. The BS chooses which grant to terminate based on various criteria including: fairness and the size of the current allocation to the MS.

A low-bandwidth continuous forward link grant channel may be used to indicate adjustments to the Current Grant to the MS. The MS modifies its Current Grant variable based on the actual grants (and adjustments) it receives from the BS. Since grants are continuously extended to the MS, it is not necessary to indicate a long grant to the MS. The long grant request (if used) just allows the BS to look-ahead and thus making better scheduling decisions.

The encoding on the low-bandwidth continuous forward link grant channel may be as follows:
- +1 if the mobile station is instructed to increase T/P by configured amount, a (could be also T/P dependent)
- −1 if the mobile station is instructed to decrease T/P by configured amount, a (could be also T/P dependent)
- 0 if the mobile station is instructed to keep T/P unchanged.

If the BS does not decode the continuous request channel reliably (for example the reverse pilot channel (R-PICH) is received with low power and continuous request channel symbols are erased), the BS sets the forward grant channel symbol to 0. Otherwise, if the continuous request channel is reliably decoded, the BS sets the forward grant channel symbol appropriately.

While the BS resource manager determines the congestion level based on the MS requests, and instead of requiring a continuous grant channel per MS, with some loss of flexibility, it is possible to use a continuous common grant channel that just indicates the current computed level of congestion at the BS (for example, encoded as one of three levels shown above). Based on such an indication, the MS can autonomously adjust its data rate following the same logic. For example, when the BS common grant indicates congestion level 1, MS requesting 10 must decrease their T/P while MS requesting 01 can increase their T/P for the subsequent transmission. Moreover, while reducing the overhead on the forward link, the continuous common grant channel takes away the ability of the BS to discriminate among contending MS based on additional criteria. It is also possible to eliminate the continuous request channel and reduce this to autonomous operation by the MS. The congestion indication from the BS is based on current measurements of resource usage by the MS, rather than MS requests. Thus, there is no closed loop per MS. In this case, the BS is unable to distinguish between MS whose QoS is being satisfied and those whose QoS is not being met and so is unable to enforce fairness.

As such, signaling errors on the continuous request and grant channels are not catastrophic. An erasure on the continuous forward grant channel is assumed to be a command to leave the Current Grant unchanged. Due to the low-delay closed loop mechanism any signaling errors would quickly be corrected by subsequent requests and grants. In particular, the local variable Current Grant at the MS becomes known to the BS at every reverse link frame transmission and allows the two sides of the control loop to maintain the same state.

It is possible to operate the reverse link QoS management using just the request and grant messages. However, for tight QoS management, i.e. to manage QoS for services with bursty arrivals, variable rates and tight delay constraints, it is necessary to use the continuous request and grant channels. Note that the continuous request channel can be used without the continuous grant channel.

For a negotiated QoS traffic, the MS may operate as following:
- The MS sends a request message that indicates the required T/P (and congestion T/P). The request message may also contain maximum T/P (the headroom at the MS). The BS may indicate a T/P grant through a message, or the grant may be implicit (a known initial T/P). In the latter case, no request or grant message is required.
- Changes to the required T/P are indicated on the low-overhead continuous rate request channel. The channel is subject to set up and release with Layer 3 signaling. Since this channel represents the aggregate rate requirement for the MS, only one such channel is needed per MS.
- Changes to the granted T/P are indicated by the base station on the low-overhead continuous grant channel on the forward link. Alternately, a low-overhead continuous common grant channel may be used which indicates the congestion level based on the received requests.

During a soft handoff operation, the message-based reverse resource management is handled by the serving BS only (the BS with the highest averaged pilot level received at the MS). The continuous request and grant channels may be received and transmitted only by the serving BS or by a reduced active set of BS. If the continuous grant channel is transmitted only by the serving BS, the operation in soft handoff does not differ from the case when mobile station is not in soft handoff. However, if the forward fast grant channel is transmitted from more than one BS in the active set, the different BS may operate independently and generate different grant commands. The MS is then required to adjust its Current Grant variable to the minimum of the rate adjustments granted by all the BS in the active set.

The overhead per MS for continuous request and grant channels is comparable to using the message based channels once every few hundred ms. Thus, to match the overhead, the rate request and rate grant messages need not be sent more frequently than for example 250 ms per MS, including all services at the MS. Continuous feedback channels may be necessary to manage QoS for services where the maximum delay is less than for example 100 ms. Even for services with bursty arrivals where the queue sizes can vary significantly over tens of ms. If the delay deadlines are greater than 250 ms, then the QoS may be managed through message based request and grant channels. There may be a need for 2-4 bits every 20-40 ms for the continuous reverse rate request channel. These bits indicate to the BS requested modifications to its allocated rate and/or the need for a long grant.

Generally, a framework is disclosed for QoS and resource management on the reverse link, where the packet queues are distributed at the MS and the centralized resource manager is at the BS. In this framework, the responsibility of reverse link QoS management is assigned to the MS while the BS manages the aggregate resource and admission control for negotiated QoS services. The MS provides to the resource manager the required resource (rate or T/P) that it needs to meet its QoS. This is different from previous approaches where the MS provides queue backlog information to the resource manager. The queue backlog information is not sufficient for the resource manager to meet QoS guarantees. Reverse link QoS is managed through a closed loop control of allocated rate or T/P by the MS. The QoS requirements for multiple services (or flows) are merged into a compact representation of resource (rate or T/P). This permits efficient (low communications overhead) for the closed loop control. This permits the MS to determine a required T/P that will allow it to meet QoS requirements of all services. A low complexity mechanism to re-compute the rate (or T/P) and duration requirements following packet departures, packet arrivals, changes in allocated rate or changes in the link quality. Low-overhead continuous request and grant channels that are consistent with the framework and are suitable to manage QoS for services with maximum delay requirements of less than 100 ms. A process is disclosed for computing T/P requirements for different levels of congestion by using a drop priority for packets. A compact encoding of the rate request channel is disclosed that provides the BS resource manager information to determine level of congestion at the packet queues distributed among the MS. Further, it allows the BS resource manager to make intelligent allocation decisions among the contending MS. Therefore, the BS resource manager operates to allocate the resource among the contending MS, including operation of the closed loop rate control in soft handoff.

Figure 4:
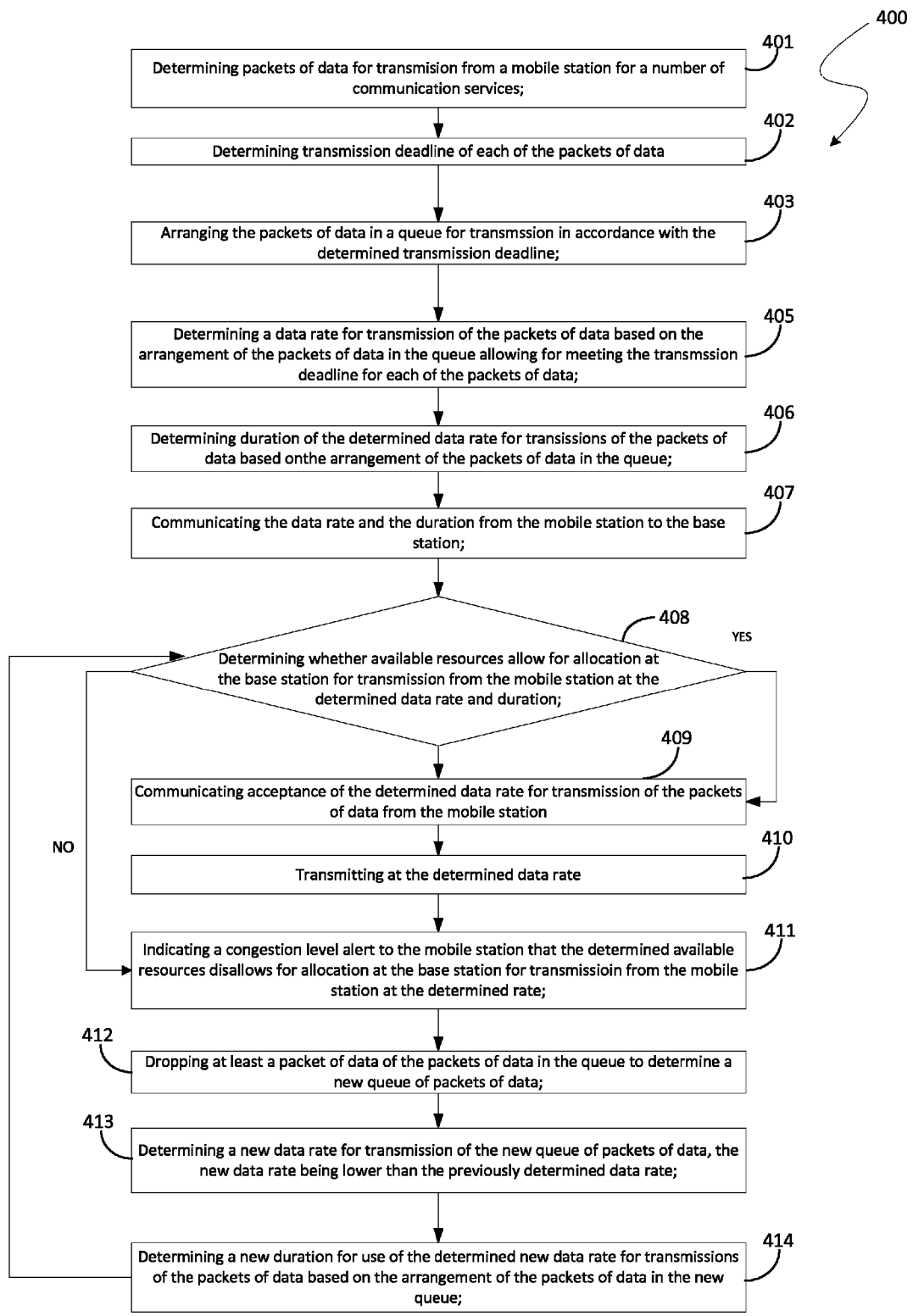
FIG. 4 depicts a flow of messages and processes for determining a data rate for reverse link communication.

Various aspects of the invention may be more apparent by referring to various steps depicted in FIG. 4. FIG. 4 depicts a flow 400 of messages and processing steps at a BS and a MS in the communication system 100. The receiver and transmitter systems 200 and 300 shown in FIGS. 2 and 3 may operate to perform various steps when incorporated in a respective base station or mobile station in the communication system 100. At step 401, the mobile station determines packets of data for transmission for a number of communication services. At steps 402 and 403, respectively, the mobile station determines a transmission deadline of each of the packets of data and arranges the packets of data in a queue for transmission in accordance with the determined transmission deadline. At steps 405, 406 and 407, respectively, the mobile station determines a data rate for transmission of the packets of data based on the arrangement of the packets of data in the queue allowing for meeting the transmission deadline for each of the packets of data, determines duration of the determined data rate for transmissions of the packets of data based on the arrangement of the packets of data in said queue, and communicates the data rate and the duration from the mobile station to the base station. At step 408, the base station determines whether available resources allow for allocation at the base station for transmission from the mobile station at the determined data rate and duration. At step 409, the base station communicates acceptance of the determined data rate for transmission of the packets of data from the mobile station. At step 410, the mobile station transmits at the accepted data rate. At step 411, the base station may indicate a congestion level alert to the mobile station that the determined available resources disallow for allocation at the base station for transmission from the mobile station at the determined data rate. At steps 412, 413 and 414, the mobile station drops at least a packet of data of the packets of data in the queue to determine a new queue of packets of data, determines a new data rate for transmission of the new queue of packets of data, the new data rate being lower than the previously determined data rate, and determines a new duration for use of the determined new data rate for transmissions of the packets of data based on the arrangement of the packets of data in the new queue. The flow 400 moves to step 408 to repeat the determination for acceptance or rejection.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. In a communication system, a method for determining a data rate for reverse link communication from a mobile station to a base station, the method comprising:
   determining, at said mobile station, packets of data for transmission from the mobile station for a number of communication services;
   determining, at said mobile station, a transmission deadline of each of said packets of data;
   arranging, at said mobile station, the packets of data in a queue for transmission in accordance with said determined transmission deadline;
   determining, at said mobile station, a data rate for transmission of the packets of data based on the arrangement of said packets of data in said queue allowing for meeting the transmission deadline for each of said packets of data;

determining, at said mobile station, a duration for use of said data rate for transmission of the packets of data based on the arrangement of said packets of data in said queue;

communicating, by said mobile station, said data rate for transmission of the packets of data and said duration for use of said data rate from said mobile station to said base station; and receiving, at said mobile station from said base station, a congestion level alert when it is determined that available resources disallow for allocation at said base station for transmission from said mobile station at said data rate for transmission of the packets of data and for said duration for use of said data rate.

2. The method as recited in claim 1 further comprising:
communicating said determined duration from said mobile station to said base station.

3. The method as recited in claim 1 further comprising:
determining, at said mobile station, whether the available resources allows for allocation at said base station for transmission from said mobile station at said data rate for transmission of the packets of data.

4. The method as recited in claim 1 further comprising:
dropping, at said mobile station, at least a packet of data of said packets of data in said queue to determine a new queue of packets of data; and determining, at said mobile station, a new data rate for transmission of said new queue of packets of data, wherein said new data rate is lower than said data rate for transmission of the packets of data.

5. The method as recited in claim 4 further comprising:
determining, at said mobile station, a new duration for use of said new data rate for transmissions of the packets of data based on the arrangement of said packets of data in said new queue.

6. The method as recited in claim 1, wherein updated information relating to queue length and packet delay deadlines are available at the mobile station.

7. The method as recited in claim 1, wherein a resource manager allocating a negotiated Quality of Service is performed at the base station.

8. The method as recited in claim 1, wherein the determining the data rate for transmission of the packets of data comprises:
examining, at the mobile station, transmission deadlines for all of the packets of data in the queue to determine the data rate for transmission of the packets of data.

9. The method as recited in claim 1, wherein the determining the data rate for transmission of the packets of data comprises:
examining, at the mobile station, a first packet in the queue having a shortest deadline to determine the data rate for transmission of the packets of data.

10. In a communication system, a method for determining a data rate for reverse link communication from a mobile station to a base station, the method comprising:
determining, at said mobile station, packets of data for transmission from the mobile station for a number of communication services;

determining, at said mobile station, a transmission deadline of each of said packets of data;

arranging, at said mobile station, the packets of data in a number of queue arrangements for transmission in accordance with said determined transmission deadline;

determining, at said mobile station, a number of data rates for transmission of the packets of data based on a number of possible queue arrangements;

determining, at said mobile station, a duration for use of each of said number of data rates for transmissions of the packets of data based on the arrangement of said packets of data in a queue;

communicating, by said mobile station, said number of data rates and said duration for use of each of said number of data rates from said mobile station to said base station; and receiving, at said mobile station from said base station, an indication when it is determined that available resources allows for allocation at said base station for transmission from said mobile station at at least one of said number of data rates and for the duration for use of said at least one of said number of data rates.

11. The method as recited in claim 10 wherein said number of data rates include a required data rate, and at least one congestion level data rate.

12. The method as recited in claim 10 further comprising:
communicating said determined duration from said mobile station to said base station.

13. The method as recited in claim 10 further comprising:
determining, at said base station, whether the available resources allows for allocation at said base station for transmission from said mobile station at least one of said number of data rates.

14. An apparatus for determining a data rate for reverse link communication from a mobile station to a base station, the apparatus comprising:
a processor in the mobile station configured to:
determine packets of data for transmission from the mobile station for a number of communication services;

determine a transmission deadline of each of said packets of data;

arrange the packets of data in a queue for transmission in accordance with said determined transmission deadline;

determine a data rate for transmission of the packets of data based on the arrangement of said packets of data in said queue allowing for meeting the transmission deadline for each of said packets of data; and determine a duration for use of said data rate for transmissions of the packets of data based on the arrangement of said packets of data in said queue; and a transmitter configured to:
communicate said data rate for transmission of the packets of data and said duration for use of said data rate from said mobile station to said base station; and receive, at said mobile station from said base station, a congestion level alert when it is determined that available resources disallow for allocation at said base station for transmission from said mobile station at said data rate for transmission of the packets of data and for said duration for use of said data rate.

15. The apparatus as recited in claim 14, wherein the transmitter is further configured to communicate said determined duration from said mobile station to said base station.

16. The apparatus as recited in claim 14, wherein the base station is configured to determine whether the available resources allows for allocation at said base station for transmission from said mobile station at said data rate for transmission of the packets of data.

17. The apparatus as recited in claim 14, wherein the processor is further configured to:
- drop at least a packet of data of said packets of data in said queue to determine a new queue of packets of data; and
- determine a new data rate for transmission of said new queue of packets of data, wherein said new data rate is lower than said data rate for transmission of the packets of data.

18. The apparatus as recited in claim 17, wherein the processor is further configured to determine a new duration for use of said determined new data rate for transmissions of the packets of data based on the arrangement of said packets of data in said new queue.

19. A non-transitory computer readable medium for determining a data rate for reverse link communication from a mobile station to a base station, encoded with a computer program comprising:
- code for determining packets of data for transmission from the mobile station for a number of communication services;
- code for determining a transmission deadline of each of said packets of data;
- code for arranging the packets of data in a queue for transmission in accordance with said determined transmission deadline;
- code for determining a data rate for transmission of the packets of data based on the arrangement of said packets of data in said queue allowing for meeting the transmission deadline for each of said packets of data;
- code for determining a duration for use of said data rate for transmissions of the packets of data based on the arrangement of said packets of data in said queue;
- code for communicating said data rate for transmission of the packets of data and said duration for use of said data rate from said mobile station to said base station; and
- code for receiving, at said mobile station from said base station, a congestion level alert when it is determined that available resources disallow for allocation at said base station for transmission from said mobile station at said data rate for transmission of the packets of data and for said duration for use of said data rate.

20. The non-transitory computer readable medium as recited in claim 19, wherein the computer program further comprises:
- code for communicating said determined duration from said mobile station to said base station.

21. The non-transitory computer readable medium as recited in claim 19, wherein the computer program further comprises:
- code for determining whether the available resources allows for allocation at said base station for transmission from said mobile station at said data rate for transmission of the packets of data.

22. The non-transitory computer readable medium as recited in claim 19, wherein the computer program further comprises:
- code for dropping at least a packet of data of said packets of data in said queue to determine a new queue of packets of data; and
- code for determining a new data rate for transmission of said new queue of packets of data, wherein said new data rate is lower than said data rate for transmission of the packets of data.

23. The non-transitory computer readable medium is recited in claim 22, wherein the computer program further comprises:
- code for determining a new duration for use of said determined new data rate for transmissions of the packets of data based on the arrangement of said packets of data in said new queue.

\* \* \* \* \*